US012398027B1

(12) United States Patent
Christensen

(10) Patent No.: US 12,398,027 B1
(45) **Date of Patent: *Aug. 26, 2025**

(54) JACK SUPPORT APPARATUS AND METHOD OF USE

(71) Applicant: AGA Tools & Products, Inc., Escondido, CA (US)

(72) Inventor: Hans Martin Christensen, Escondido, CA (US)

(73) Assignee: AGA Tools & Products, Inc., Escondido, CA (US)

( * ) Notice: Subject to any disclaimer, the term of this patent is extended or adjusted under 35 U.S.C. 154(b) by 230 days.

This patent is subject to a terminal disclaimer.

(21) Appl. No.: 17/982,568

(22) Filed: Nov. 8, 2022

Related U.S. Application Data

(63) Continuation-in-part of application No. 17/726,358, filed on Apr. 21, 2022, now Pat. No. 11,505,440.

(51) Int. Cl.
*B66F 1/02* (2006.01)

(52) U.S. Cl.
CPC .......... *B66F 1/02* (2013.01); *B66F 2700/025* (2013.01)

(58) Field of Classification Search
CPC ............................. B66F 1/02; B66F 2700/025
See application file for complete search history.

(56) References Cited

U.S. PATENT DOCUMENTS

| | | | | | |
|---|---|---|---|---|---|
| 3,355,136 | A * | 11/1967 | Staples | F16M 11/046 | 248/352 |
| 4,796,864 | A * | 1/1989 | Wilson | B60S 9/08 | 254/425 |
| 5,423,518 | A * | 6/1995 | Baxter | B60S 9/08 | 254/419 |
| 5,794,907 | A * | 8/1998 | Bellia | B66F 5/04 | 248/354.7 |
| 11,505,440 | B1 * | 11/2022 | Christensen | B66F 13/00 | |

* cited by examiner

*Primary Examiner* — Seahee Hong
(74) *Attorney, Agent, or Firm* — Master Key IP, LLP; Jeromye V. Sartain

(57) ABSTRACT

A jack support apparatus has an outer tube having an outer tube body with an outwardly-extending outer tube jack cradle and an opposite outer tube opening, an inner tube having an inner tube body with a plurality of spaced-apart inner tube holes and an outwardly-extending inner tube jack cradle, the inner tube body slidably received within the outer tube body through the outer tube opening, the outer and inner tube jack cradles configured to each selectively engage one of the wheel axle and the cup axle of the jack, and a pin operable through an outer tube hole for selectively engaging any of the plurality of inner tube holes.

28 Claims, 14 Drawing Sheets

JACK SUPPORT APPARATUS AND METHOD OF USE

RELATED APPLICATIONS

This is a continuation-in-part application and so claims the benefit pursuant to 35 U.S.C. § 120 of a prior filed and co-pending U.S. Non-Provisional patent application Ser. No. 17/726,358 filed Apr. 21, 2022, and entitled “Jack Support Apparatus and Method of Use.” The contents of the aforementioned application are incorporated herein by reference.

BACKGROUND

The subject of this patent application relates generally to tools and equipment, and more particularly to a jack support apparatus configured for providing mechanical “fail-safe” support to hydraulic floor jacks.

The following description includes information that may be useful in understanding the present invention. It is not an admission that any of the information provided herein is prior art or relevant to the presently claimed invention, or that any publication specifically or implicitly referenced is prior art.

Applicant(s) hereby incorporate herein by reference any and all patents and published patent applications cited or referred to in this application, to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

By way of background, in a variety of contexts but particularly the automotive context, a jack is often needed or employed to lift a portion of the vehicle to change a tire or the oil or to perform other repairs. Most vehicles come equipped with a mechanical scissor-lift jack for jacking up a portion of the vehicle, as by positioning such a jack on the ground under the vehicle with its lift surface adjacent to a frame member or jack point and then actuating the jack as by rotating the lead screw to cause the jack to extend upwardly, make contact with the vehicle, and then lift the vehicle as the jack’s lead screw is further rotated. While such scissor-lift jacks, screw-type jacks, and other mechanical jacks are generally effective, they are relatively time consuming to operate, typically have smaller weight capacity than other kinds of jacks, and are relatively less safe due to their relatively small base.

Alternatively and certainly in more common use by auto mechanics in shops and regular do-it-yourselfers at home are hydraulic floor jacks, which have a relatively larger wheeled base and a lift arm that is pivotably installed on the base operably in conjunction with a hydraulic cylinder and piston and related handle that may be used to push or pull the jack into position and then actuated or pumped up and down via its yoke mechanism to operate a valve and push hydraulic fluid into the cylinder and pressurize it, thereby pushing the lifting piston up or out of the cylinder. When the hydraulic jack is thus positioned as desired under a vehicle with its lift cup at the free end of the lift arm adjacent to the lift point on the underside of the vehicle, as the handle is continually pumped, the lifting piston is gradually extended from the cylinder such that its mechanical coupling with the arm causes the arm to pivot upwardly relative to the base and hence to lift the vehicle. When the job is completed and the vehicle is to again be lowered, typically, the handle is simply slowly rotated to open the valve and gradually release pressure in the hydraulic cylinder and thus gradually lower the vehicle. It will be appreciated that the key to safe and effective operation of such hydraulic jacks is creating and maintaining the required pressure in the cylinder and that if such pressure were suddenly lost such as due to a valve, seal or o-ring, or other mechanical failure, the jack would lose all power and no longer be able to support the vehicle, causing the vehicle to suddenly drop, which of course would be extremely dangerous and even deadly.

Oftentimes, whether for safety reasons or because both sides or two portions of a vehicle are to be lifted, one or more jack stands may be employed to support a portion of the vehicle once it is lifted to a sufficient height by a jack. An automotive jack stand is typically formed having flared legs or a somewhat pyramid-shaped base with a central vertical passage in which is slidably installed a shaft having a lift surface at its upper end and horizontal teeth along the shaft that may be selectively engaged by a cross-pin passing through the jack stand base so as to intersect the passage and thus seat against a tooth of the shaft to effectively lock the shaft at a desired vertical position relative to the base and thus become a somewhat rigid weight-bearing structure at a desired pre-set height. Thus, with the jack stand so configured and positioned at a desired location on the ground underneath the vehicle, the employed jack can be slowly lowered until the weight of that portion of the vehicle is on the jack stand rather than the jack, allowing the jack to be removed and, as needed, to be used elsewhere such as to lift another portion of the vehicle.

Accordingly, jack stands have the advantage of supporting the weight of at least a portion of a vehicle with effectively no moving parts, or certainly only mechanical parts that are less likely to fail, while not relying on and tying up a jack at all times while a vehicle is being supported. But even so, such jack stands have a number of shortcomings. For one, due to the structure and the minimum height of a typical jack stand, it cannot be inserted until the vehicle is a minimum height off the ground at the desired location, which can create complexities even if just one side is to be lifted and particularly if both sides of the vehicle must be lifted, requiring that the vehicle be “walked up” by gradually jacking up one side and then the other in alternating fashion while gradually increasing the height setting of each jack stand until both jack stands on opposite sides of the vehicle are safely positioned at the same final height. Further, and perhaps more significantly, it will be appreciated that the locations of a traditional jack stand and of the jack itself must be different. For many older vehicles that have significant areas of the frame or chassis available or lengthwise pinch welds along the length of the chassis or frame to serve as jack points, the jack and jack stand locations being different is not problematic even if still not ideal when it is desired to jack up and then support a vehicle in the same vicinity (e.g., the front left if the driver’s side front tire were to be changed). But for many newer vehicles with weight-reduction designs, composite panels, and somewhat hidden frame and chassis features, only a select few jack points are provided by the manufacturer that alone must be used to jack up the vehicle else damage the vehicle or have it fall, such as four total jack points at the respective four “corners” of the vehicle. In such vehicles that have dedicated jack points, which are usually no larger than the jack surface itself, it is thus impossible to both jack up the vehicle at a particular jack point and place a jack stand at that same jack point.

To address such challenges of employing jack stands at dedicated jack points on newer or exotic vehicles or when there is simply not much room to employ a jack and jack stand separately side-by-side, one proposed product is effectively a jack stand that may be assembled and disassembled and thus be employed with a hydraulic floor jack as the vehicle is lifted so that the jack and jack stand can be at the same location. One such product, known as the "RennStand" manufactured and sold by Safe Jack in Pasco, Washington, has a crossbar that may be disassembled from its two opposite legs and positioned on or across the jack surface or floor jack cup, between the jack surface and the vehicle jack point, which crossbar may also accept on its top side various adapters depending on the jack point configuration. By positioning the jack and thus the crossbar and jack surface appropriately under the vehicle and raising the jack until the crossbar or any related adapter is in contact with the vehicle jack point, further actuation of the jack will lift the crossbar and that portion of the vehicle to the desired height or ground clearance. With the jack and vehicle so lifted, height-adjustable legs of the RennStand may be assembled onto opposite ends of the crossbar and adjusted to a desired height at or above the ground via clevis pins and corresponding cross-holes in the crossbar and legs, and then the jack may be lowered until the weight of that portion of the vehicle is on the RennStand and the jack can be removed, the splayed legs of the RennStand effectively straddling the floor jack. As such, while the RennStand is aimed at solving the problem of locating a jack stand at the same jack point at which a vehicle is to be lifted or jacked up, it does so through a system of removable parts and pins that is relatively cumbersome, which separable parts or pins may fail or be lost, rendering the RennStand inoperable, and which assembled RennStand results in a jack "bridge" of sorts that has a wider base or "footprint" than the floor jack itself, a disadvantage for certain automobiles and automotive repairs where tight spaces are involved.

What has been needed and heretofore unavailable is a compact and easy-to-use tool or piece of equipment that effectively converts a hydraulic floor jack into a jack stand, thereby more safely, quickly, and effectively supporting a vehicle especially with limited jack points and limited space. Aspects of the present invention fulfill these needs and provide further related advantages as described in the following summary.

SUMMARY

Aspects of the present invention teach certain benefits in construction and use which give rise to the exemplary advantages described below.

The present invention solves the problems described above by providing a jack support apparatus for selectively locking a hydraulic floor jack against further downward movement. In at least one embodiment, the apparatus comprises an outer tube having an outer tube body comprising at least one outer tube wall with an outer tube hole formed in the outer tube wall, an outwardly-extending outer tube jack cradle, and an outer tube opening opposite the outer tube jack cradle, the outer tube jack cradle configured to selectively engage one of the wheel axle and the cup axle, an inner tube having an inner tube body comprising at least one inner tube wall with a plurality of spaced-apart inner tube holes formed in the inner tube wall and an outwardly-extending inner tube jack cradle, the inner tube body slidably received within the outer tube body through the outer tube opening with the inner tube wall adjacent to the outer tube wall, the inner tube jack cradle configured to selectively engage one of the wheel axle and the cup axle, the outer tube jack cradle and the inner tube jack cradle being opposite and symmetrical, and a pin operable through the outer tube hole for selectively engaging any of the plurality of inner tube holes, wherein selective operation of the pin by shifting the pin away from the inner tube disengages the pin from any of the plurality of inner tube holes and allows the inner tube to shift relative to the outer tube as by the inner tube body sliding within the outer tube body, and further wherein selective operation of the pin by shifting the pin toward the inner tube engages the pin in one of the plurality of inner tube holes as the inner tube shifts relative to the outer tube as by the inner tube body sliding within the outer tube body to align the outer tube hole with a select one of the plurality of inner tube holes to prevent further relative movement between the outer tube and the inner tube, whereby the apparatus is configured to temporarily form a rigid linkage between the wheel and cup axles upon engagement therebetween by the outer tube and inner tube jack cradles to effectively lock the jack against further downward movement.

Other objects, features, and advantages of aspects of the present invention will become more apparent from the following detailed description, taken in conjunction with the accompanying drawings, which illustrate, by way of example, the principles of aspects of the invention.

BRIEF DESCRIPTION OF THE DRAWINGS

The accompanying drawings illustrate aspects of the present invention. In such drawings.

Figure 1:
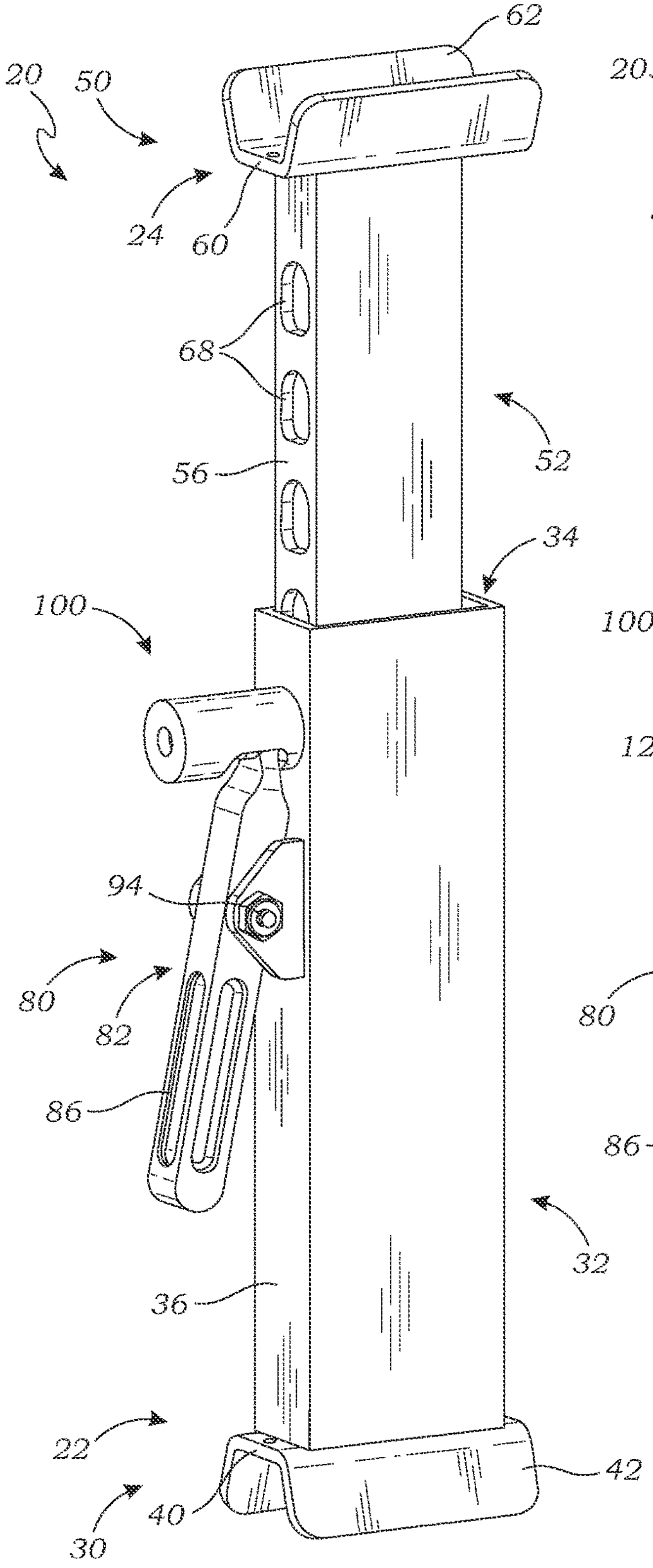
FIG. 1 is a perspective view of an exemplary jack support apparatus in a first position, in accordance with at least one embodiment.

The above described drawing figures illustrate aspects of the invention in at least one of its exemplary embodiments, which are further defined in detail in the following description. Features, elements, and aspects of the invention that are referenced by the same numerals in different figures represent the same, equivalent, or similar features, elements, or aspects, in accordance with one or more embodiments. More generally, those skilled in the art will appreciate that the drawings are schematic in nature and are not to be taken literally or to scale in terms of material configurations, sizes, thicknesses, and other attributes of an apparatus according to aspects of the present invention and its components or features unless specifically set forth herein.

DETAILED DESCRIPTION

The following discussion provides many exemplary embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

While the inventive subject matter is susceptible of various modifications and alternative embodiments, certain illustrated embodiments thereof are shown in the drawings and will be described below in detail. It should be understood, however, that there is no intention to limit the invention to any specific form disclosed, but on the contrary, the inventive subject matter is to cover all modifications, alternative embodiments, and equivalents falling within the scope of the claims.

Turning now to FIG. 1, there is shown a perspective view of an exemplary embodiment of a jack support apparatus 20 according to aspects of the present invention. The apparatus 20 comprises, in the exemplary embodiment, an outer tube 30, an inner tube 50 telescopically or slidably received in the outer tube 30, and a handle assembly 80 and a pin assembly 100 that cooperate to selectively adjust the overall height of the apparatus 20 in use. An outer tube jack cradle 42 at a first end 22 of the apparatus 20 and an inner tube jack cradle 62 at an opposite second end 24 of the apparatus 20 define the points of mechanical engagement with features of a hydraulic floor jack J (FIGS. 8-11) as explained further below. At a high level, it will be appreciated that the general functional configuration of the jack support apparatus 20 as shown and described herein is illustrative and non-limiting and such device can take other forms and employ other mechanical means now known or later developed without departing from the spirit and scope of the invention as set forth herein. For example, while the outer and inner tubes 30, 50 are shown as each having a rectangular profile or cross-section with flat or planar walls, a number of other shapes for such telescoping tubes 30, 50, including but not limited to annular, are possible according to aspects of the present invention. Similarly, the shape or configuration of the outer and inner tube jack cradles 42, 62 may vary to suit particular applications or contexts, such as different types or styles of jacks and engagement points thereon. And while particular configurations or mechanical arrangements of the handle and pin assemblies 80, 100 are shown and described herein as the means for selectively extending and locking the jack support apparatus 20 at a desired position or length, it will be appreciated that a variety of other mechanical means may similarly be employed without departing from the spirit and scope of the invention, as will be further appreciated with reference to the alternative exemplary embodiments shown in FIGS. 12-19 and the related discussion further below, including the alternative lever assembly 130 in the embodiment of FIGS. 18 and 19 as effectively a substitute for the cooperating handle and pin assemblies 80, 100. Fundamentally, what is shown and described herein in various exemplary embodiments is a new and novel telescoping assembly for selectively mechanically engaging a hydraulic floor jack or the like to effectively convert the jack into a jack stand or effectively prevent the unwanted downward movement or collapse of the jack under load thereby providing a "fail-safe" for the floor jack. Once again, those skilled in the art will appreciate that such can be accomplished by a jack support apparatus 20 according to aspects of the present invention and other such mechanical arrangements that operate on essentially the same principle of selectively and temporarily providing a structural strut or support member between points on the jack to prevent its unintended collapse and so can take a variety of forms to do so beyond the exemplary embodiments. Even so, a number of functional benefits are derived from the exemplary jack support apparatus 20 in assembly and use that render it particularly safe, quick, and effective as will be appreciated from the present disclosure.

Figure 2:
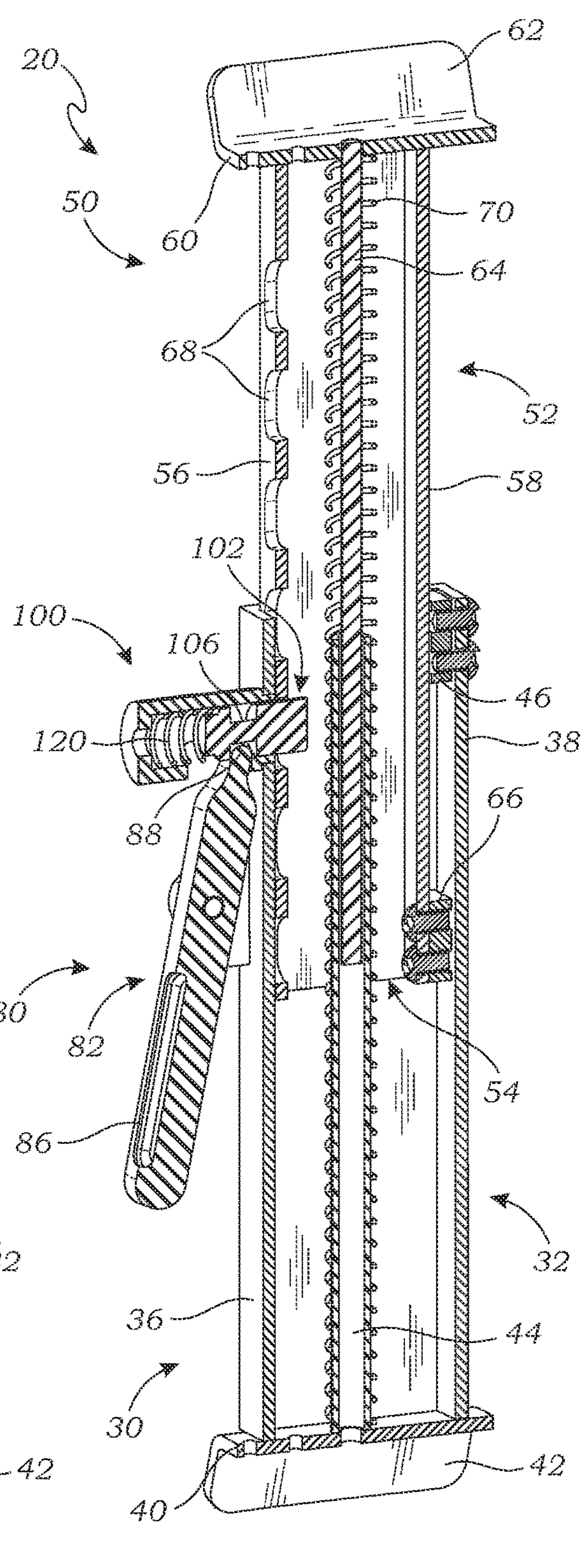
FIG. 2 is a cross-sectional perspective view thereof, in accordance with at least one embodiment.
Figure 6:
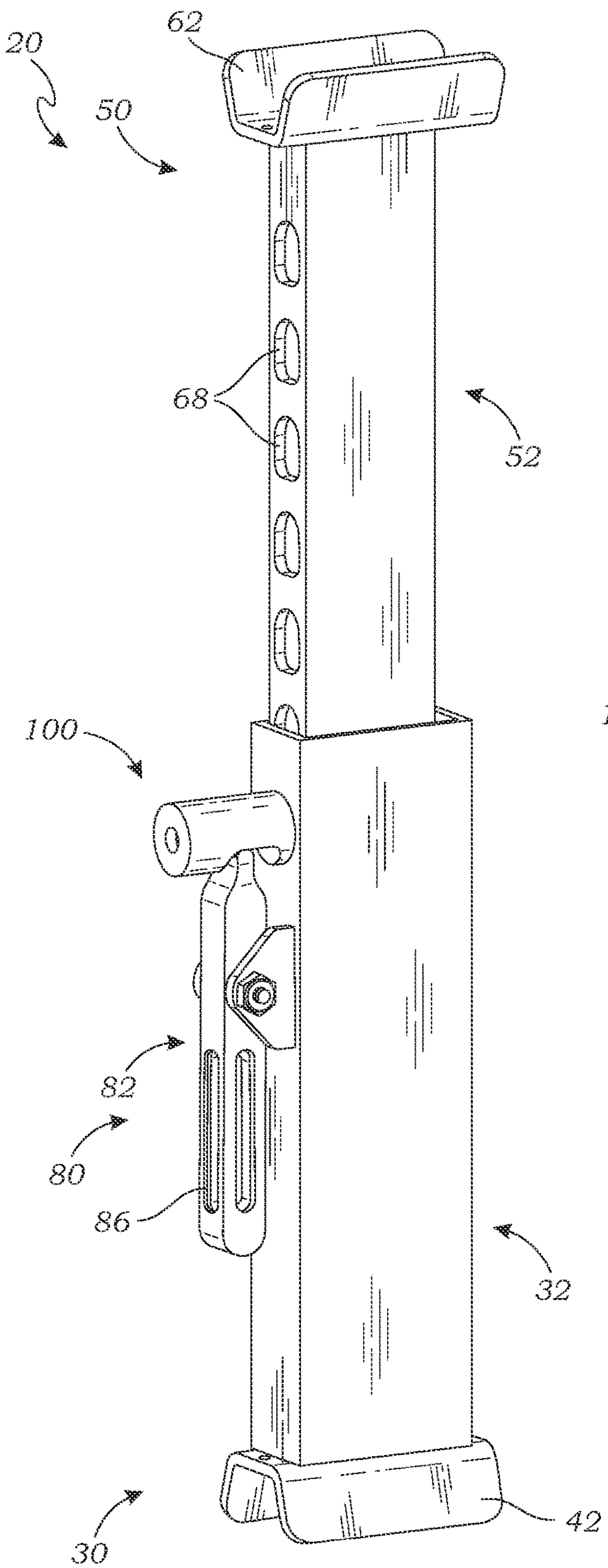
FIG. 6 is a perspective view of the exemplary jack support apparatus of FIG. 1 in a second position, in accordance with at least one embodiment.
Figure 7:
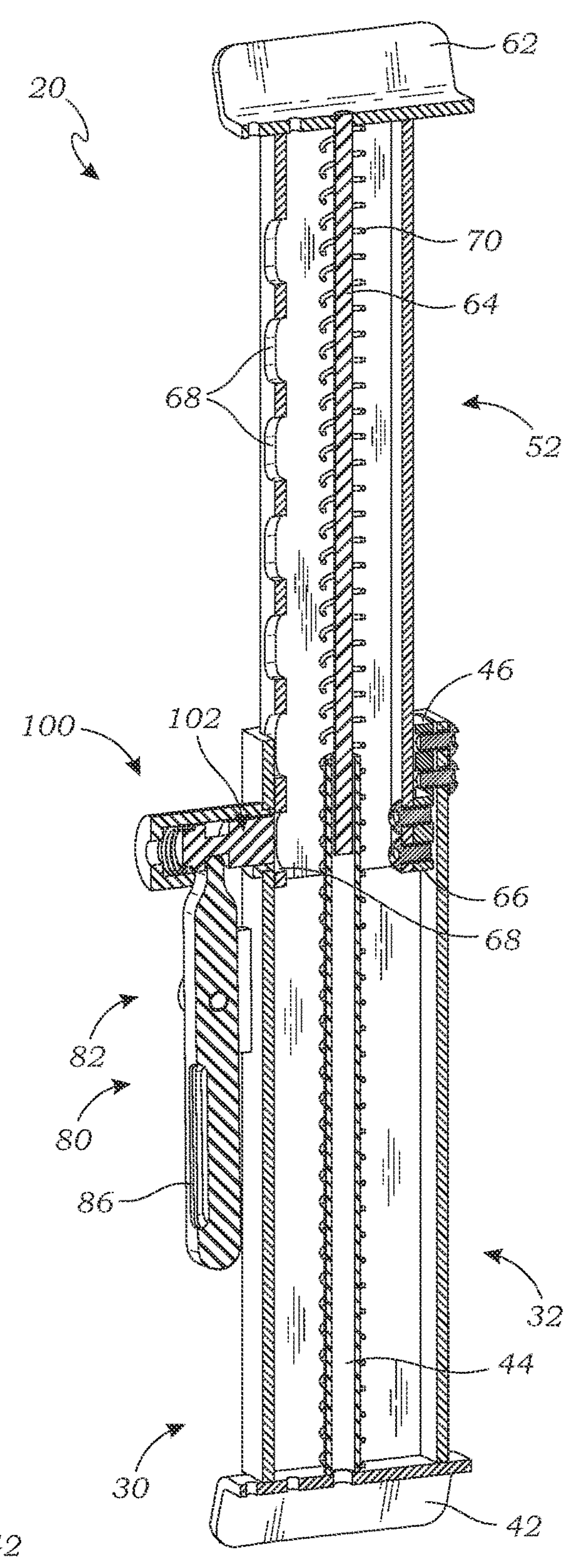
FIG. 7 is a cross-sectional perspective view thereof, in accordance with at least one embodiment.

With continued reference to FIG. 1 and now with reference also to the cross-sectional view of FIG. 2, the exemplary jack support apparatus 20 again includes the main outer and inner tubes 30, 50 that telescopically slide relative to each other so as to extend or retract, or lengthen or shorten, the overall apparatus 20. Once more, as illustrated, both the outer tube body 32 and the inner tube body 52 are formed as hollow, substantially rectangular cross-section members that are sized such that the inner tube 50 is slidably received within the outer tube 30 in a somewhat net-fit arrangement, at least on three sides, the outer tube body 32 being formed with or defining an outer tube opening 34 for receipt of the inner tube body 52. Spaced-apart holes 68 are formed along a side wall 56 of the inner tube body 52 configured to be selectively engaged by a pin 102 of the pin assembly 100 that is installed on a corresponding side wall 36 of the outer tube body 32 so as to lock the inner tube 50 relative to the outer tube 30 in a desired position, thereby setting the overall length of the apparatus 20, an exemplary intermediate position between fully extended and fully retracted positions being shown. The pin 102 is biased inwardly by a pin spring 120 so as to force the pin 102 toward the inner tube body 52 and into a corresponding hole 68 of the inner tube 50 once aligned such that the default is for the apparatus 20 to lock in position, more about which is said below, particularly in connection with FIGS. 8-11 regarding use of the jack support apparatus 20. In order to lift the pin 102 out of engagement with or in a particular inner tube hole 68 against the biasing effect of the pin spring 120 and so enable adjustment of the length of the apparatus 20, a handle assembly 80 is installed on the outer tube body 32 adjacent to and operably engaged with the pin assembly 100. Specifically, a pivotable handle 82 is configured having a tip 88 that engages an undercut 106 of the pin 102 such that squeezing the handle 82 to shift the grip 86 toward the outer tube 30 alternately lifts the tip 88 and thus the pin 102 until it is retracted from the inner tube hole 68 it was seated in, thereby allowing the inner tube 50 to slide or move freely relative to the outer tube 30, or specifically the inner tube body 52 relative to the outer tube body 32. As also shown, the inner tube 50 is biased away from the outer tube 30 axially, or the jack support apparatus 20 is biased toward its fully-extended position, by an axial or lengthwise tube spring 70 operably installed within the telescoping assembly of the outer and inner tubes 30, 50. Specifically, the tube spring 70 seats at its opposite ends on the respective outer tube and inner tube end walls 40, 60 and thereby exerts an axially outward spring force on or between the outer and inner tubes 30, 50 and is thereby axially compressed as the inner tube 50 is slid inwardly or toward the outer tube 30. To facilitate such seating of the tube spring 70 and prevent unwanted flexing, kinking, or "walking" of the tube spring 70, an outer tube sleeve 44 extends inwardly and axially from the outer tube end wall 40 toward the outer tube opening 34 parallel to the outer tube body 32, and a corresponding inner tube rod 64 extends inwardly and axially from the inner tube end wall 60 toward an opposite inner tube opening 54 parallel to the inner tube body 52 such that the inner tube rod 64 is slidably or telescopically received within the outer tube sleeve 44 just as the inner tube body 52 is slidably or telescopically received within the outer tube body 32, with the tube spring 70 positioned about the outer tube sleeve 44 and the inner tube rod 64 so as to be axially stabilized and spatially constrained thereby, in the exemplary embodiment the outer tube sleeve 44, inner tube rod 64, and tube spring 70 being substantially annular, and in any case the outer tube sleeve 44 and inner tube rod 64 together serving as a spring guide for the tube spring 70. It will thus be appreciated that the slidable engagement between the outer and inner tube bodies 32, 52 and the outer tube sleeve 44 and inner tube rod 64 cooperate to axially align and facilitate telescopic movement between the outer and inner tubes 30, 50, which again are biased apart or toward a fully-extended position of the jack support apparatus 20 by the internally-contained tube spring 70. It will also be appreciated that instead of the exemplary arrangement the sleeve could be installed in the inner tube and the rod in the outer tube. As also shown in FIG. 2, an inwardly-projecting outer tube stop 46 may be formed on a side wall 38 of the outer tube body 32 near the outer tube opening 34 and a corresponding inwardly-projecting inner tube stop 66 may be formed on a side wall 58 of the inner tube body 52 near the inner tube opening 54 such that the outer and inner tube stops 46, 66 make contact with each other at the fully-extended position of the apparatus 20 as shown in FIGS. 6 and 7 so as to prevent separation of the outer and inner tubes 30, 50 during use. It will also be appreciated that the outer and inner tube stops 46, 66 provide stand-offs between the outer tube side wall 38 and the inner tube side wall 58 to effectively set the somewhat net-fit sliding arrangement of the outer and inner tube bodies 32, 52 opposite the first side walls 36, 56 that are immediately adjacent in the exemplary embodiment. As also seen in FIGS. 1 and 2, the outer tube end wall 40 in part exteriorly forms or defines the outer tube jack cradle 42 and the inner tube end wall 60 in part exteriorly forms or defines the inner tube jack cradle 62, more about which is said below in connection with FIGS. 8-11 regarding the jack support apparatus 20 in use.

Figure 3:
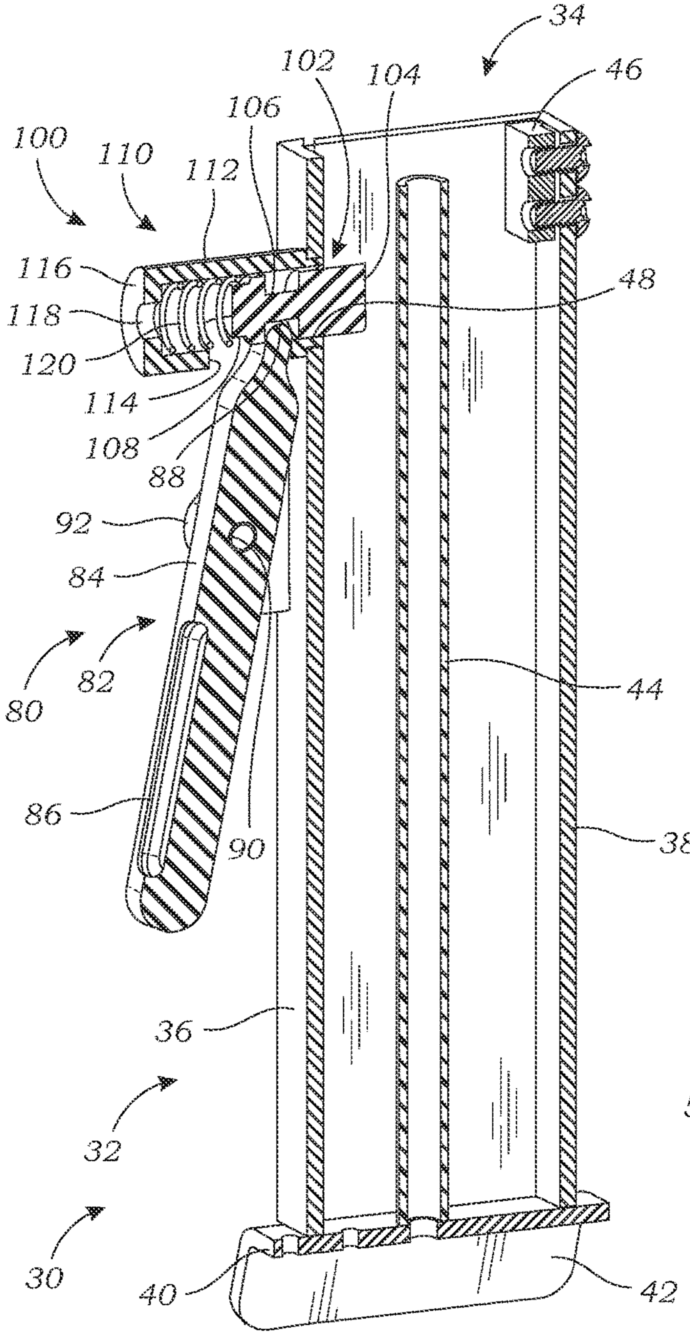
FIG. 3 is an enlarged cross-sectional perspective view of an outer tube thereof, in accordance with at least one embodiment.

Referring next to FIG. 3, there is shown an enlarged cross-sectional view of the outer tube 30 of the exemplary jack support apparatus 20 (FIGS. 1 and 2) according to aspects of the present invention. In the exemplary embodiment, the outer tube 30 comprises an outer tube body 32 having one side wall 36 on which are installed both the handle assembly 80 and the pin assembly 100 and an opposite side wall 38 on which is installed the outer tube stop 46 near the outer tube opening 34. And again, extending inwardly and axially from the outer tube end wall 40 opposite from and toward the outer tube opening 34 is the outer tube sleeve 44 configured for slidable receipt therein of the inner tube rod 64 (FIGS. 2 and 4) and thereabout of the tube spring 70 (FIG. 2). The pin assembly 100 is shown as comprising a hollow pin housing 110 installed on the outer tube side wall 36 substantially in or about a corresponding outer tube hole 48 with the pin 102 slidably and operably installed within the housing 110 and hole 48. In a bit more detail, the pin housing 110 is shown as having an annular side wall 112 and an end wall 116 opposite the hole 48 and the pin 102 as having a cylindrical pin body 104, an intermediate circumferential undercut 106 formed in the pin body 104, and a proximal pin head 108 on which is seated the biasing pin spring 120, between the pin 102 and the pin housing end wall 116. The pin 102 may thus be somewhat of a net fit in slidably operating within the pin housing 110, or more particularly, the outside diameter of the pin body 104 and the inside diameter of the pin housing side wall 112 may be approximately the same, though with at least a few thousandths of an inch (0.002 in.) clearance depending the materials, smoothness, and other factors, more about which is said below. To prevent any pressure build-up (positive or negative (i.e., vacuum)) within the pin housing 110 in the area trapped between the sliding pin 102 and the side and end walls 112, 116 of the housing 110, where the pin spring 120 is positioned and operates, an opening 118 may be formed in the housing end wall 116 to allow for air flow in or out. And in order for the tip 88 of the handle 82 of the handle assembly 80 to operably engage the pin undercut 106, an opening 114 is formed in the pin housing side wall 112 as shown. The handle assembly 80 is then formed once again as generally comprising a handle 82 having an elongate handle body 84 having a proximal grip 86 and an opposite distal tip 88, with an intermediate cross-hole 90 formed in the handle body 84 so as to pivotally install the handle 82 on a handle base 92 as by passing a bolt or cross-pin 94 (FIG. 1) through the handle base 92 and the cross-hole 90 of the handle body 84 so that the handle 82 then pivots on the handle base 92 about the cross-pin 94. Notably, the handle cross-hole 90 and the handle base 92 are so positioned that the handle tip 88 is operably seated within the pin undercut 106 as shown. By way of further illustration and not limitation, while the handle assembly 80, and particularly the base 92 thereof, is shown as installed on the outer tube body side wall 36, it will be appreciated that it may be installed instead or in addition on other portions of the outer tube body 32. It will once again be appreciated by those skilled in the art that the handle and pin assemblies 80, 100 may be configured in other ways employing materials and mechanisms now known or later developed so as to selectively engage or lock the outer and inner tubes 30, 50 relative to each other in setting the desired height or position of the jack support apparatus 20, such that the exemplary handle and pin assemblies 80, 100 and the overall outer and inner tubes 30, 50 are to be understood as illustrative and non-limiting.

Figure 4:
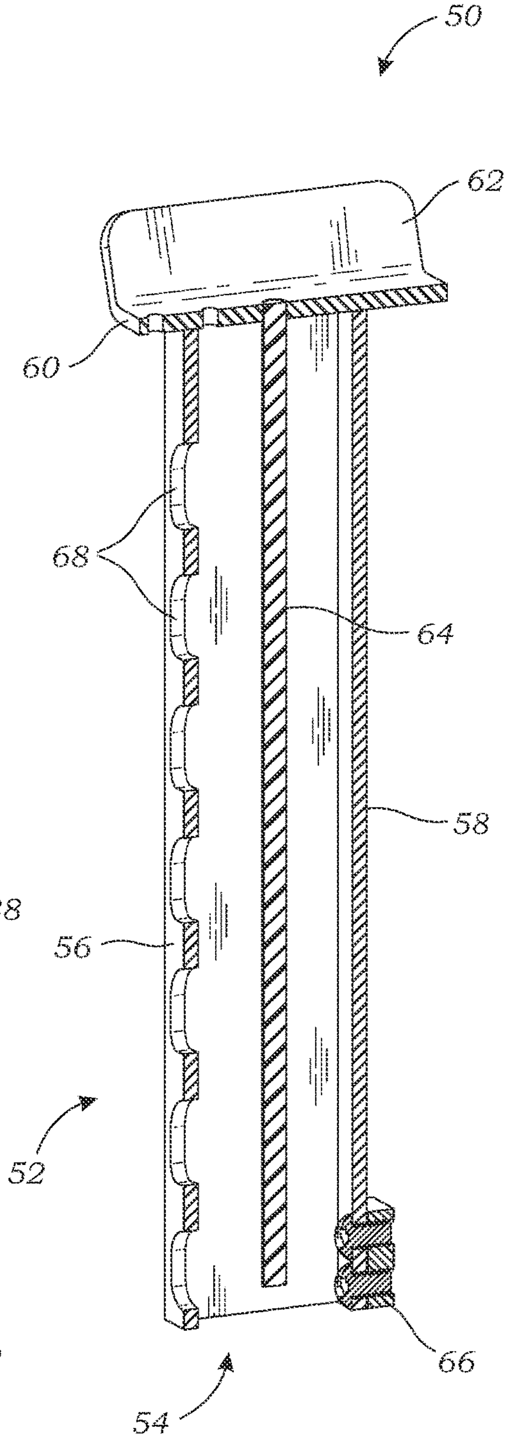
FIG. 4 is an enlarged cross-sectional perspective view of an inner tube thereof, in accordance with at least one embodiment.

Similarly, in FIG. 4 there is shown an enlarged cross-sectional view of the inner tube 50 of the exemplary jack support apparatus 20 (FIGS. 1 and 2) according to aspects of the present invention, in the exemplary embodiment the inner tube 50 comprising an inner tube body 52 having one side wall 56 in which are formed the series of spaced-apart holes 68 configured for selective engagement by the pin 102 of the outer tube pin assembly 100 and an opposite side wall 58 on which is installed the inner tube stop 66 near the inner tube opening 54. And again, extending inwardly and axially from the inner tube end wall 60 opposite from and toward the inner tube opening 54 is the inner tube rod 64 configured for slidable receipt within the outer tube sleeve 44 (FIGS. 2 and 3) and partially thereabout of the tube spring 70 (FIG. 2).

Figure 5:
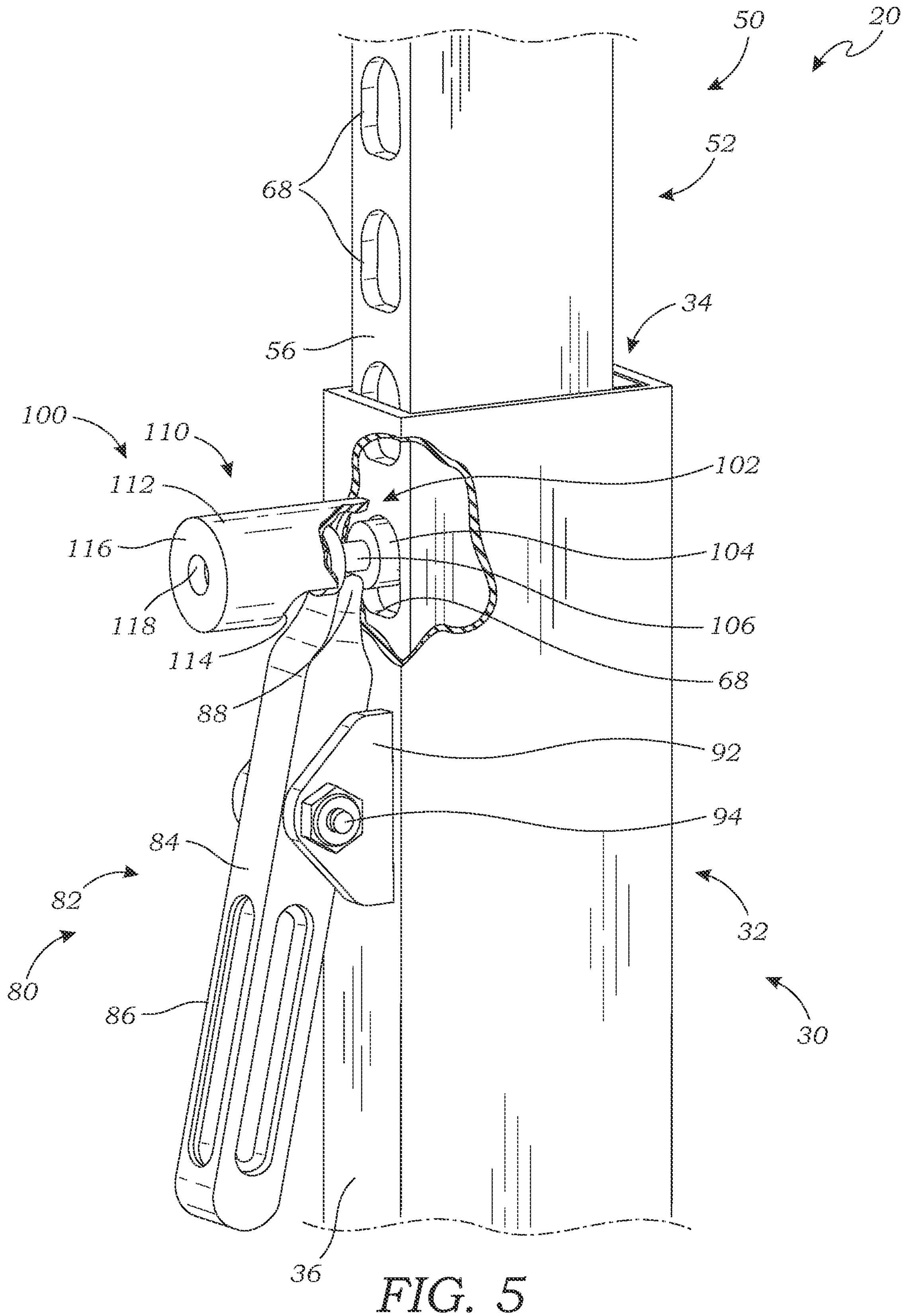
FIG. 5 is an enlarged partial and partially cutaway perspective view of the exemplary jack support apparatus of FIG. 1 in the first position, in accordance with at least one embodiment.

Turning to FIG. 5, there is shown a further enlarged partial perspective view of the exemplary jack support apparatus 20 of FIGS. 1 and 2, partially cut-away to reveal and further illustrate the handle and pin assemblies 80, 100 and particularly the interaction of the handle 82 with the pin 102. Once more, the handle assembly 80 is installed on the outer tube 30 such that the handle tip 88 is operably positioned as passing through the pin housing side wall opening 114 and into the pin body undercut 106. It will be appreciated that by forming the undercut 106 circumferentially about the pin body 104, no matter how the pin 102 is rotated within the pin housing 110, the same engagement between the handle tip 88 and the pin undercut 106 is achieved. In operation, when the handle 82 is not actuated and the handle grip 86 is released or not manipulated, the pin 102 will be pushed toward the inner tube 50 under the biasing influence of the pin spring 120. If the pin body 104 is not aligned with one of the holes 68 formed in the side wall 56 of the inner tube body 52, it will be appreciated that the pin body 104 will stop against the side wall 56 itself and ride therealong as the inner tube 50 is slid or shifted relative to the outer tube 30 until the pin body 104 is positioned adjacent to or clears an inner tube hole 68, at which time, again under the influence of the pin spring 120, the pin 102 will be shifted further toward the inner tube 50 and the pin body 104 will enter and seat within the adjacent hole 68 so as to lock the apparatus 20 as shown, which is effectively the default or "at rest" configuration of the apparatus 20, irrespective of which hole 68 the pin 102 is seated within. It is also noted that by virtue of the continual engagement of the handle tip 88 within the pin undercut 106, the travel of the pin 102 along the pin housing 110 is limited, on which basis the handle tip 88 effectively serves as a "keeper" for the pin 102 within the pin housing 110, with the travel of the tip 88 limited by the handle body 84 itself as it comes into contact with the outer tube side wall 36 and/or a portion of the handle base 92 so as to limit or prevent further travel of the handle 82 and thus of the pin 102. Whereas, when the jack support apparatus 20 is to be adjusted or set to a different length, the proximal handle grip 86 is shifted toward the outer tube 30, and the outer tube side wall 36 specifically, via the handle 82 pivoting about the intermediate cross-pin 94, as by pushing on or squeezing the grip 86, causing the distal handle tip 88 opposite the grip 86 to pivot away from the outer tube 30 and thereby lift the pin 102 or shift the pin 102 away from the outer and inner tubes 30, 50 and out of engagement with the corresponding hole 68 in the inner tube 50. Those skilled in the art will appreciate that by having a length or portion of the handle body 84 indicated as the grip 86 extend beyond the handle cross-hole 90 (FIG. 3) and related handle cross-pin 94 further than the handle body 84 extends from the cross-pin 94 to the handle tip 88, there is increased leverage via the handle grip 86, and increasingly so the further from the pivot point or cross-pin 94, relative to the biasing effect of the pin spring 120 (FIGS. 2 and 3) acting on the pin 102, the handle body 84 and particularly the grip portion 86 thereof serving as a mechanical lever for lifting or actuating the locking pin 102. Accordingly, those skilled in the art will appreciate that by so forming the handle assembly 80 relative to the pin assembly 100 even a relatively strong spring force of the pin spring 120 can be overcome by relatively low force applied to the handle grip 86 during use of the apparatus 20 as through actuation of the handle 82. Moreover, it will be appreciated that a relatively strong spring force of the pin spring 120 is desirable to produce relatively rapid insertion of the pin body 104 into the corresponding inner tube hole 68 and thus relatively rapid locking of the apparatus 20 in the case of even rapid jack lowering, more about which is said below in connection with FIGS. 8-11. Relatedly, as shown, the inner tube holes 68 may be formed having a somewhat oval or oblong profile rather than being perfectly round, which it will be appreciated will assist with the spring-forced insertion of the pin body 104 in such hole 68 even while the inner tube 50 is still in motion or sliding relative to the outer tube 30.

Briefly referring to FIGS. 6 and 7, there are shown perspective and cross-sectional perspective views of the exemplary jack support apparatus 20 of FIGS. 1 and 2 now in a second position as by actuating the handle 82 of the handle assembly 80 to lift the pin 102 of the pin assembly 100 out of engagement with a hole 68 of the inner tube 50, which it will be appreciated from the foregoing is accomplished by shifting or squeezing the grip 86 of the handle 82 toward the outer tube 30 to thereby cause or allow the inner tube 50 to slide axially relative to the outer tube 30 under the biasing effect of the tube spring 70 until the outer tube and inner tube stops 46, 66 make contact as shown, unless the outer and inner tube jack cradles 42, 62 made contact with the structure of a jack or the like before the outer tube and inner tube stops 46, 66 were able to make contact. With the apparatus 20 so operated with the handle 80 remaining actuated or "squeezed," it will be appreciated that the inner tube 50 can be freely slid against the tube spring 70 relative to or toward the outer tube 30 until the relative positions of the outer and inner tubes 30, 50 or the overall length of the apparatus 20 is as desired, at which point the handle grip 86 may be released and the pin body 104 will again enter into an adjacent inner tube hole 68 based on slight further relative movement between the outer and inner tubes 30, 50 until the pin 102 effectively "clicks" into place to lock the apparatus 20 in position or at the desired overall length. It will also be appreciated that at all such positions or lengths of the jack support apparatus 20, the outer and inner tubes 30, 50 remain sufficiently engaged for functional integrity under vertical load, with the outer tube sleeve 44 and inner tube rod 64 also remaining slidably engaged even at the fully-extended position of the apparatus 20, at all times providing lateral stability and serving as a spring guide for the tube spring 70 as shown.

With reference to FIGS. 1-7, in forming the exemplary jack support apparatus 20, and particularly the outer and inner tubes 30, 50, and the various components thereof, it will be appreciated that any appropriate materials and methods of construction now known or later developed may be employed, including but not limited to metals and metal alloys such as iron, steel, aluminum, and the like and potentially even a variety of sufficiently strong and stiff plastics and composites such as polytetrafluoroethylene ("PTFE"), polyether ether ketone ("PEEK"), polyetherimide ("PEI"), polyamide-imide ("PAI"), polybenzimidazole ("PBI"), polypropylene, polystyrene, polyvinyl chloride ("PVC"), acrylonitrile butadiene styrene ("ABS"), polyethylenes such as high density polyethylene ("HDPE") and low density polyethylene ("LDPE"), polycarbonate, polyurethane, and other such plastics, thermoplastics, thermosetting polymers, and the like, any such components being fabricated or formed as through machining, casting, forging, extrusion, stamping, forming, injection molding, or any other such technique now known or later developed. Relatedly, such components may be formed integrally or may be formed separately and then assembled in any appropriate secondary operation employing any assembly technique now known or later developed, including but not limited to fastening, as through screws or the like, bonding, welding, press-fitting, snapping, over-molding or coining, or any other such technique now known or later developed. Those skilled in the art will fundamentally appreciate that any such materials and methods of construction are encompassed within the scope of the invention, any exemplary materials and methods in connection with any and all embodiments thus being illustrative and non-limiting. In the exemplary embodiment, the outer tube body 32, the inner tube body 52, the outer and inner tube end walls 40, 60 and associated jack cradles 42, 62, and the locking pin 102 are formed of mild steel (e.g., 4130 steel), which is to say the load-bearing components of the jack support apparatus 20. Other components such as the handle assembly 80, including the handle 82 and handle bracket or base 92, the pin housing 110, the outer and inner tube stops 46, 66, and the outer tube sleeve 44 and inner tube post 64 may also be made of 4130 or other steel or of aluminum (e.g., 6061 aluminum). Dimensionally, in the exemplary embodiment, the outer tube body 32 is nominally 1 in.×2 in. on its outer profile and 7.5 in. long, with a wall thickness of 0.12 in., setting its nominal interior dimensions at 0.88 in.×1.88 in., while the inner tube body 52 is nominally 0.75 in.×1.5 in. on its outer profile and 7.625 in. long, with a wall thickness again of 0.12 in., resulting in a lateral clearance between the outer and inner tube bodies 32, 52 of approximately 0.065 in. ((0.88 in.−0.75 in.)/2). The locking pin 102 and particularly its body 104 is 0.48 in. diameter and nominally 1 in. long, with the distal portion of the body 104 that engages the inner tube holes 68 being 0.5 in. long, the width of the undercut 106 being 0.25 in. with a depth of roughly 0.15 in., and the pin head 108 on which the pin spring 120 seats being generally 0.25 in. in length along the pin 102, with a stepped proximal edge to provide a spring seat and the distal end of the pin body 104 being chamfered about its circumferential edge for assistance with the pin body 104 seating within the inner tube locking holes 68. The pin housing 110 is nominally 1.325 in. tall or long and 0.75 in. diameter with a wall thickness of 0.125 in., the inside bore length thus being approximately 1.2 in. and the inside or bore diameter in which the pin 102 slidably operates thereby being 0.5 in., thus setting a clearance between the pin body 104 outside diameter and the pin housing 110 inside diameter of about 0.01 in. ((0.5 in.−0.48 in.)/2), with the pin housing side wall opening 114 being approximately 0.625 in. tall and approximately 0.275 in. deep for access to and operable engagement with the pin undercut 106 by the handle tip 88. And the locking holes 68 formed along the inner tube body 52 are nominally 0.5 in. wide or in diameter and 0.65 in. long, or slightly oval or oblong, allowing for approximately 0.01 in. clearance for the pin body 104 ((0.5 in.−0.48 in.)/2) widthwise and approximately 0.17 in. or about a sixth inch clearance lengthwise to again assist with the pin 102 seating within a respective locking hole 68 even while the outer and inner tubes 30, 50 are in relative motion, with the holes 68 again nominally spaced 1 in. apart, center-to-center, along the inner tube body 52, and its side wall 56 specifically, which would be the furthest a jack J could "fall" before the apparatus 20 locks in place. Relatedly, with the wall thicknesses of the outer and inner tube bodies 32, 52 being 0.12 in. or nominally an eighth inch and with the diameter of the cylindrical pin body 104 being nominally a half inch, the effective shear strength of the pin body 104 at the interface between the outer and inner tube bodies 32, 52, or specifically the respective adjacent outer and inner tube side walls 36, 56 where the pin body 104 is seated within a locking hole 68, and the compressive load-bearing capacity of the eighth-inch-thick outer and inner tube bodies 32, 52 themselves and of the opposite outer and inner tube jack cradles 42, 62 that are also nominally an eighth inch thick as well, is such that the jack support apparatus 20 is rated at two (2) tons, with a factor of safety likely of two to six times. The outer tube sleeve 44 is nominally 0.375 in. outside diameter by 0.25 in. inside diameter and 7.25 in. long, while the inner tube rod 64 is nominally 0.188 in. diameter and 7.5 in. long, resulting in clearance therebetween of approximately 0.031 in. ((0.25 in.−0.188 in.)/2). The nominal thickness of the outer and inner tube stops 46, 66 is 0.25 in., thus setting a widthwise or front-to-back clearance between the outer and inner tube bodies 32, 52 of approximately 0.13 in. (1.88 in.−1.5 in.−0.25 in.). And finally, regarding the handle 82, the body 84 is nominally 4.25 in. long by 0.5 in. square or round, with the handle cross-hole 90 located approximately 2.75 in. from the proximal end or grip 86 and thus approximately 1.5 in. from the handle tip 88, which tip 88 is nominally 0.2 in. thick for seating in the 0.25 in. wide pin undercut 106. Staying with the exemplary embodiment, it will be appreciated that the outer and inner tube bodies 32, 52 may be extruded in longer sections and cut to length, with the hole 48 in the outer tube body 32 for installation of the pin housing 110 in forming the pin assembly 100 as well as any holes such as for installation of the outer tube stop 46 machined in the outer tube body 32 and then the pin housing 110, the handle base 92, and the end wall 40 defining the outer tube jack cradle 42 welded on the outer tube body 32 and the outer tube stop 46 fastened on the outer tube body 32 as by screws, with the outer body sleeve 44 being installed on the outer tube end wall 40 via welding or a screw-type fastener, and similarly with the pattern of spaced-apart locking holes 68 machined in the inner tube body 52 again along with any holes such as for installation of the inner tube stop 66, and with the inner tube end wall 60 defining the inner tube jack cradle 62 welded on the inner tube body 52, the inner tube stop 66 fastened on the inner tube body 52 as by screws, and the inner tube rod 64 being installed on the inner tube end wall 60 via welding or a screw-type fastener. It will be appreciated that all such fabrication steps may occur first in any appropriate order and then the jack support apparatus 20 may be assembled as by inserting the pin spring 120 and pin 102 into the pin housing 110 from within the outer tube body 32 via the hole 48, securing the pin 102 in place by engaging the handle tip 88 with the pin undercut 106 through the pin housing side wall opening 114, and then pivotally securing the handle 82 on the handle base 92 as through an inserted handle bolt or cross-pin 94, thereby completing the operable assembly of the handle and pin assemblies 80, 100 on the outer tube 30, with all that then remains to complete assembly of the jack support apparatus 20 being to slide the tube spring 70 within the outer tube body 32 over the outer tube sleeve 44 and then mating the inner tube 50 with the outer tube 30 as by squeezing the handle 82 so as to lift or retract the locking pin 102 and sliding the inner tube body 52 within the outer tube body 32 while simultaneously sliding the inner tube rod 64 down through the tube spring 70 and the outer tube sleeve 44, and then locking the apparatus 20 in any position as by releasing the handle 82 and sliding the inner tube 50 relative to the outer tube 30 until the pin body 104 enters and locks within one of the inner tube locking holes 68, with the final step in preventing the inner tube 50 from disconnecting from the outer tube 30 under the influence of the tube spring 70 or otherwise being to secure the outer tube stop 46 on the outer tube body 32. The biasing coil-type tube spring 70 is formed from 0.041 in. diameter 302 stainless steel wire having a spring rate of about 7.5 lbs./in. at its installed height that ranges from about 8 in. to 13 in., having a nominal length of 20 in. and diameter of 0.44 in., and the biasing pin spring 120 is formed from 0.045 in. diameter 302 stainless steel wire having a spring rate of about 19 lbs./in. at its installed height that ranges from about 0.3 in. to 0.5 in., having a nominal length of 0.75 in. and diameter of 0.48 in. and 3.3 active coils and 5.3 total coils including the closed ends. Those skilled in the art will again appreciate that a variety of configurations and materials of construction, whether now known or later developed, are possible according to aspects of the present invention, such that any particular configurations and materials employed in the jack support apparatus 20 and its various components and assemblies are to be understood as illustrative and non-limiting, though it will be further appreciated that in the exemplary hydraulic floor jack automotive context, the disclosed design is the preferred embodiment having attendant benefits in construction and use in such context as set forth herein. Even so, those skilled in the art will also appreciate that, for example, other locking mechanisms now known or later developed beyond the illustrated handle and pin assemblies 80, 100 are possible according to aspects of the present invention, such as ratchet mechanisms and manual cross-pins. Accordingly, the locking pin 102 should be understood as potentially taking and so encompassing a variety of forms in selectively mechanically coupling the outer and inner tubes 30, 50 so as to prevent their relative movement in temporarily locking or rigidly supporting a floor jack or the like.

Figure 8:
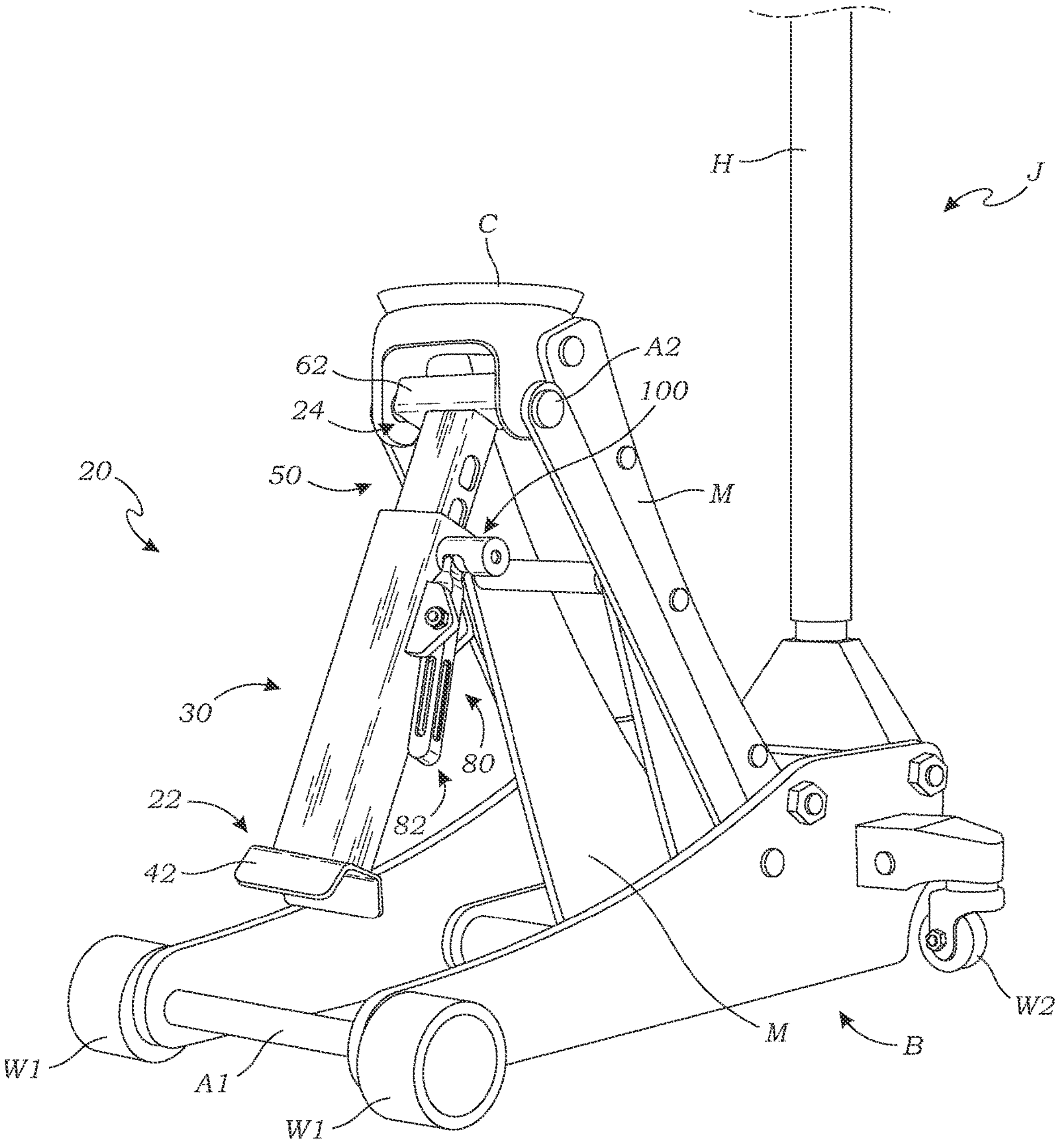
FIG. 8 is a reduced scale perspective view of the exemplary jack support apparatus of FIG. 1 as employed with a floor jack in a first operational mode, in accordance with at least one embodiment.
Figure 9:
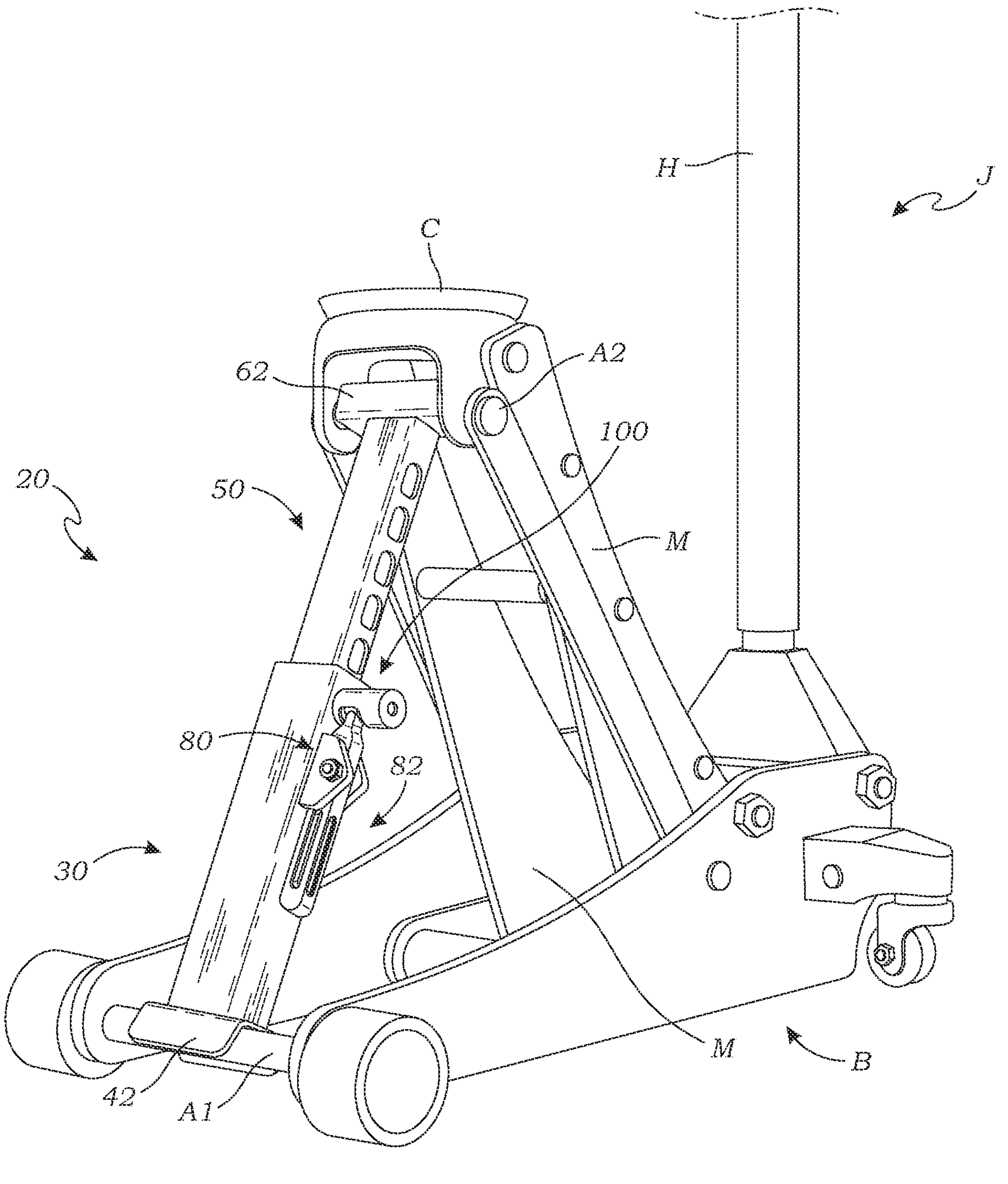
FIG. 9 is a further perspective view thereof in a second operational mode, in accordance with at least one embodiment.
Figure 10:
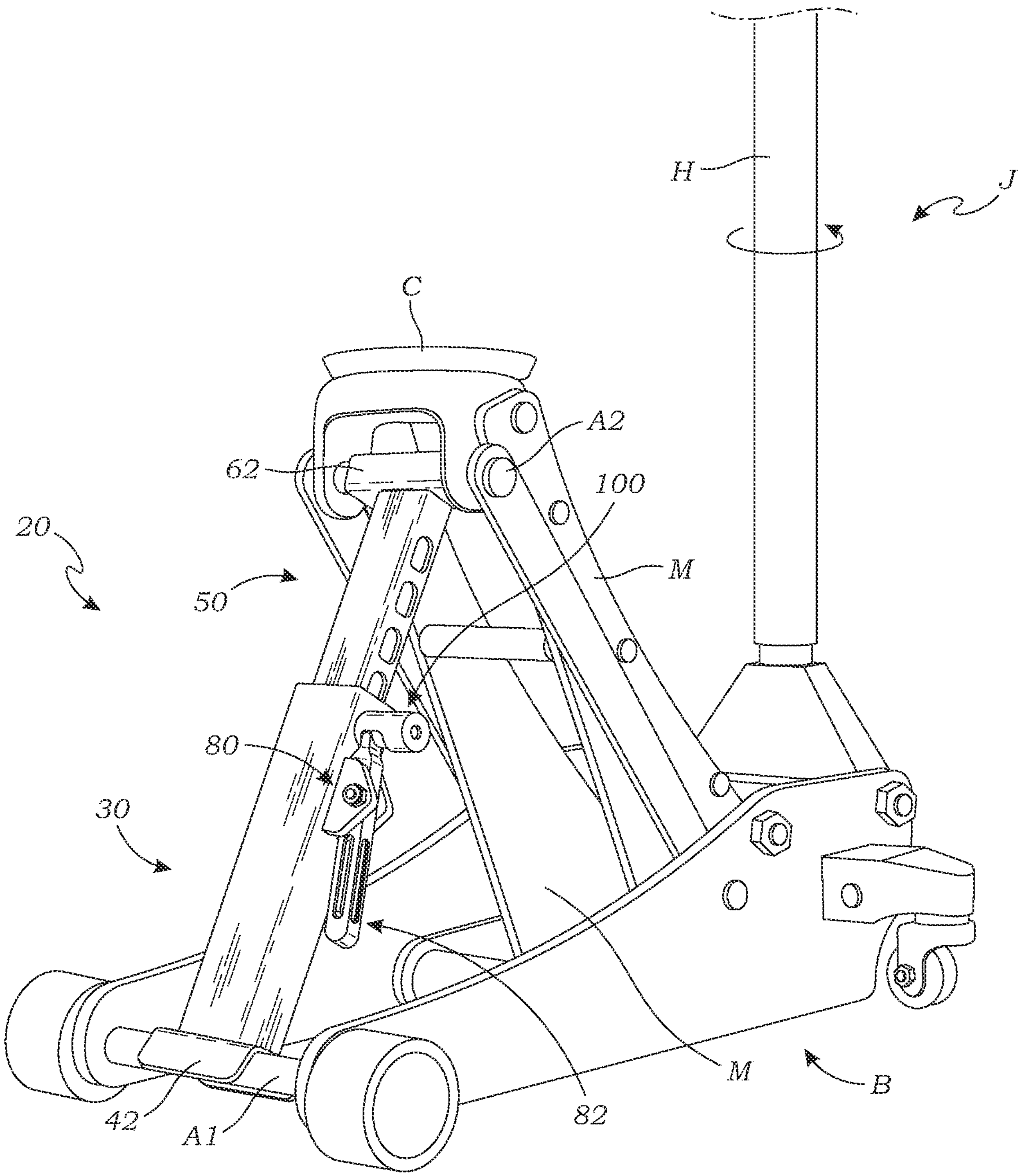
FIG. 10 is a further perspective view thereof in a third operational mode, in accordance with at least one embodiment.

Turning now to FIGS. 8-10, there are shown perspective views of the exemplary jack support apparatus 20 in three operational modes as used in connection with a conventional hydraulic floor jack J such as being rated at 1.5 to 3 tons and having a lift or height range from 3.5 to 14 inches. First, as shown in FIG. 8, the hydraulic floor jack J is operated via its handle H to lift the arms M and thus the lift pad or cup C to a desired height, such as in lifting a vehicle V as shown and described below in connection with FIG. 11. Once the jack J is at the desired position, the jack support apparatus 20 in a collapsed configuration or, as shown, any intermediate, sufficiently short configuration can be positioned adjacent to or in engagement with the jack J such that either of the jack cradles 42, 62 is in contact with one of the jack axles A1, A2, or such that the entire apparatus 20, and particularly the opposite jack cradles 42, 62, is located between the two jack axles A1, A2. The apparatus 20 is shown oriented with the outer tube 30 down and so with the first end 22 of the apparatus 20 and thus the outer tube jack cradle 42 down or toward the axle A1 of the axled wheels W1 mounted on the jack base B opposite the swivel or castor wheels W2 and with the inner tube 50 up and so with the second end 24 of the apparatus 20 and thus the inner tube jack cradle 62 up or toward the axle A2 that pivotally supports the jack lift cup C. Those skilled in the art will appreciate that the apparatus 20 can just as easily be positioned with the first end 22 and outer tube 30 up and the second end 24 or inner tube 50 down, since the device is spring and not gravity assisted for its operation and the outer and inner tube jack cradles 42, 62 are identical or symmetrical. Notably, once the handle 82 is squeezed to lift the internal locking pin 102 (FIGS. 2, 3, 5 and 7) out of engagement with the inner tube 50, the inner tube 50 will be free to slide relative to the outer tube 30 under the biasing effect of the tube spring 70 (FIGS. 2 and 7), such that it is preferable that the inner tube jack cradle 62 already be in contact with the appropriate structure of the jack J, the cup axle A2 in the illustrated embodiment, so that the inner tube 50 and its cradle 62 do not slam into any part of the jack J structure unintentionally. Thus, as illustrated in FIG. 8, the inner tube jack cradle 62 can first be nested against the jack cup axle A2 before the handle 82 is actuated to unlock the jack support apparatus 20. Then, with reference to FIG. 9, when the handle 82 is squeezed or actuated so as to unseat the locking pin 102 and unlock the apparatus 20 so that the outer and inner tubes 30, 50 can slide relative to each other, the apparatus 20 can be manipulated in a controlled extension as by simply holding the handle 82 in while also grasping the outer tube 30 and "stretching" or lengthening the apparatus 20 as by shifting the outer tube 30 down until the outer tube jack cradle 42 seats or nests on the wheel axle A1, it being appreciated that at all times the biasing effect of the internal tube spring 70 will keep the inner tube jack cradle 62 nested in contact with the cup axle A2. At that point, with the jack support apparatus 20 so extended that both the outer and inner tube jack cradles 42, 62 are in contact with the jack J structure, here the respective wheel and cup axles A1, A2, the handle 82 may be released. It will be appreciated that unless the extended configuration or length of the apparatus 20, and thus the particular height or position of the jack J, just so happens to position the locking pin 102 of the pin assembly 100 adjacent to one of the inner tube locking holes 68 (FIGS. 1, 2, and 4-7), the handle 82 will remain in its actuated position as shown in FIG. 9. Even so, it will also again be appreciated that the outward biasing effect of the tube spring 70 will keep the outer and inner tubes 30, 50 extended and the outer and inner tube jack cradles 42, 62 nested in contact with the respective wheel and cup axles A1, A2 and thus the jack support apparatus 20 in place on the jack J as shown in FIG. 9, once more, even without the apparatus 20 yet being "locked" as by pin 102 clicking into a hole 68 in the inner tube 50. Then, referring now to FIG. 10, with slight twisting of the jack handle H, shown in this example as counterclockwise by the related arrow, the jack arms M and thus the lift cup C and related lift cup axle A2 will be slightly and slowly lowered causing the inner tube 50 to slide toward or inwardly relative to the outer tube 30 until indeed the locking pin 102 is aligned with the next closest inner tube locking hole 68 and snaps into engagement therewith under the biasing effect of the pin spring 110 (FIGS. 2, 3 and 7), thus locking the jack support apparatus 20 in place as a mechanical member rigidly supporting the lift cup C and arms M in the event of a hydraulic or other failure of the jack J. Those skilled in the art will appreciate that with the exemplary jack support apparatus 20 according to aspects of the present invention and its nominal one-inch spacing of the inner tube locking holes 68, one inch is effectively the furthest the jack J would have to be lowered or the lift cup C and axle A2 would have to travel in order to lock the apparatus 20 in place and thus provide a "fail-safe" for the hydraulic floor jack J. Relatedly, if an operator even forgot to perform the last step illustrated in FIG. 10 of rotating the handle H slightly to lower the jack J until the pin 102 clicked into a hole 68 as evidenced by the handle 82 shifting outwardly to its at-rest, non-actuated position as shown in FIGS. 8 and 10 and so locking the jack support apparatus 20, thus leaving the jack J and apparatus 20 in the configuration as illustrated in FIG. 9, it will be appreciated that even so a failure of the jack J would be "caught" by the apparatus 20 due to the pin 102 engaging the next locking hole 68 under the effect of the pin spring 120 even as the jack J and thus the inner tube 50 was "falling" relative to the outer tube 30, thus still preventing the jack J from moving or collapsing more then basically one inch even if the hydraulic cylinder or related valve of the jack J completely failed and the jack support apparatus 20 was not previously locked. Thus, it will be appreciated that the jack support apparatus 20 is a compact and easy-to-use tool that provides a "fail-safe" for a hydraulic floor jack J and thus numerous advantages in use.

Figure 11:
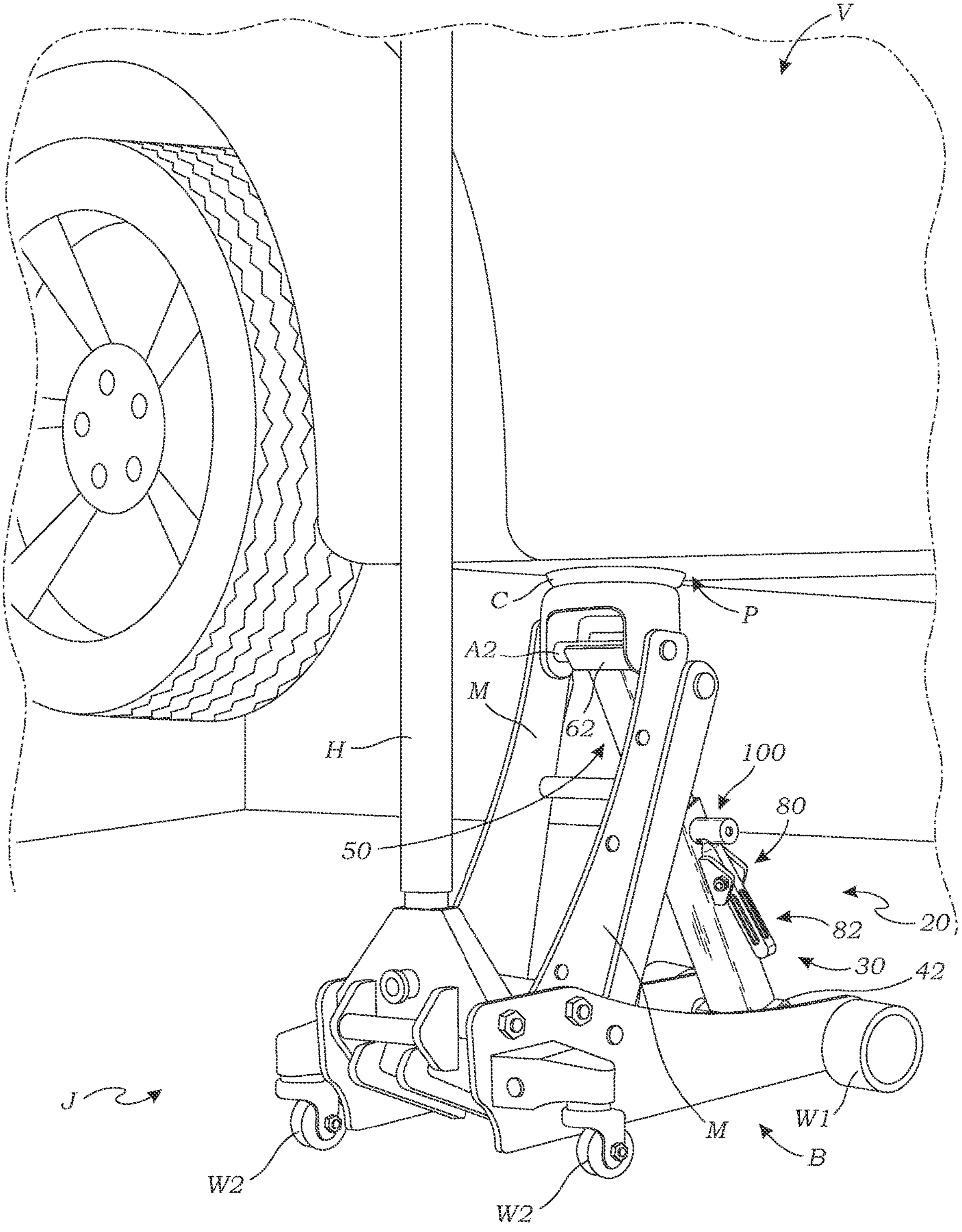
FIG. 11 is a reduced scale perspective view of the exemplary jack support apparatus of FIG. 1 as employed with a floor jack in supporting a vehicle, in accordance with at least one embodiment.

Briefly, then, with reference to FIG. 11, there is shown an exemplary jack support apparatus 20 in use with a hydraulic floor jack J in lifting or supporting at least a portion of a vehicle V. The jack J in a lowered position is first located under the vehicle V as by manipulating or rolling it on its axled and castor wheels W1, W2 operably installed on the jack base B employing the jack handle H or otherwise. Once the jack J is in position with the lift cup C adjacent to a jack point P on the underside of the vehicle V, the jack J is operated in conventional fashion as by pumping the handle H to raise the arms M and thus the lift cup C into contact with the jack point P, with continued pumping of the handle H and raising of the jack J and particularly the jack lift cup C thus raising or "jacking up" the vehicle V to a desired height. Then, with the jack J so configured, as shown, and as described above in connection with FIGS. 8-10, the jack support apparatus 20 is simply configured at an appropriate length to position it between the wheel and cup axles A1, A2 of the jack J, its handle 82 is actuated to allow the apparatus 20 to extend until the opposite jack cradles 42, 62 are nested against the respective wheel and cup axles A1, A2, the apparatus handle 82 is released, and as needed the jack handle H is rotated or manipulated to slightly lower the jack J until the apparatus locking pin 102 seats in a hole 68 in the apparatus inner tube 50 so as to lock the apparatus 20 and thus the jack J, thereby effectively converting such a conventional hydraulic floor jack J into a jack stand and, again, whether or not the final step of slightly lowering the jack J to lock the apparatus 20 is performed, a "fail-safe" is still provided. Accordingly, those skilled in the art will appreciate that the exemplary jack support apparatus 20 according to aspects of the present invention is configured as a compact and easy-to-use tool that provides rigid mechanical support to a hydraulic floor jack J under load in the event of a failure of the jack J, thereby more safely, quickly, and effectively supporting a vehicle V especially with limited jack points and/or limited space within which to work. Once again, it will be appreciated that the jack support apparatus 20 can take other forms or configurations or employ other components or mechanisms, materials, and dimensions to suit particular contexts without departing from the spirt and scope of the invention, as will be appreciated from the following discussion of various alternative exemplary embodiments as shown in FIGS. 12-19, such that the exemplary apparatus 20 of FIGS. 1-11 is to be understood as illustrative and non-limiting.

Figure 12:
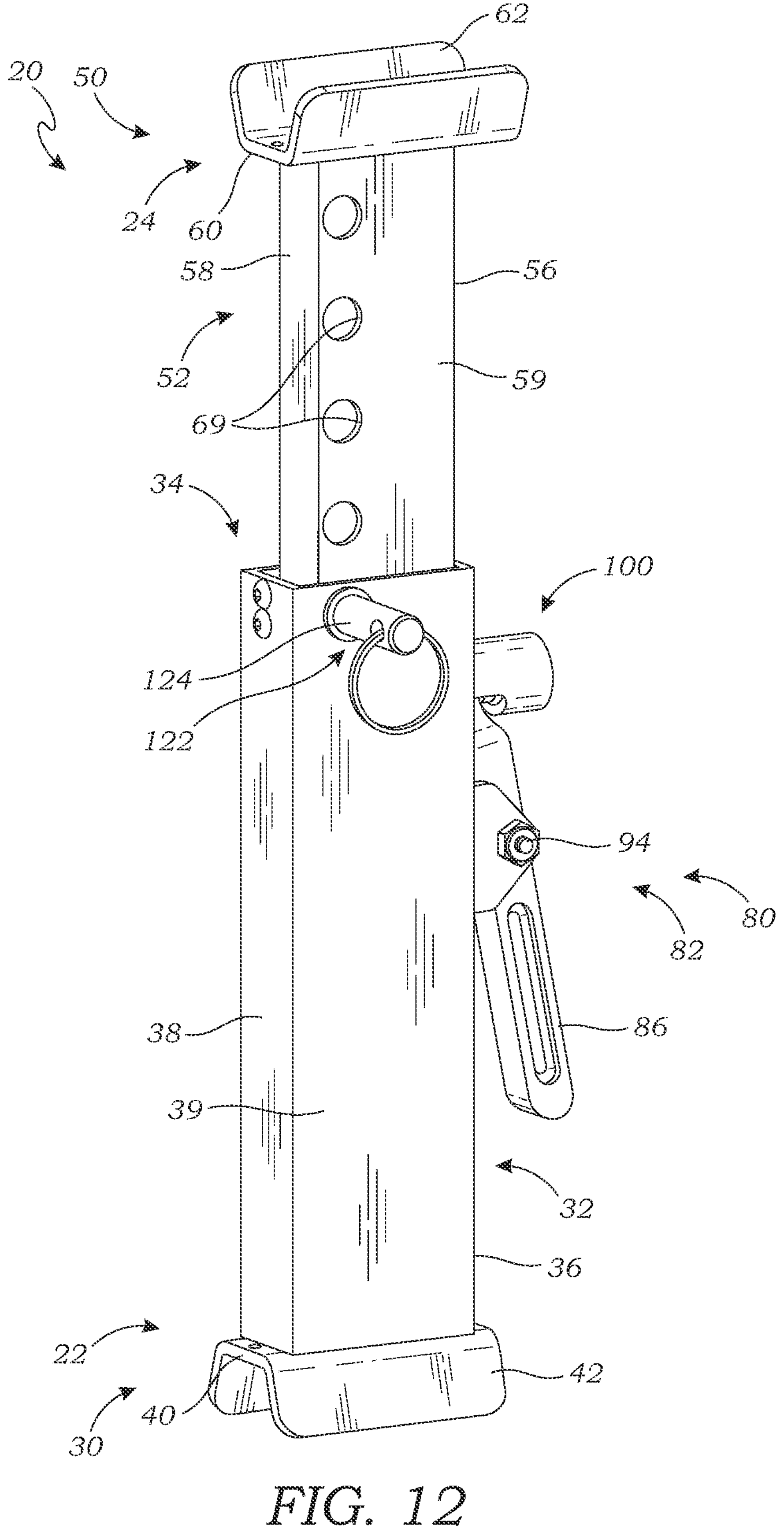
FIG. 12 is a rear perspective view of an alternative exemplary jack support apparatus, in accordance with at least one embodiment.
Figure 13:
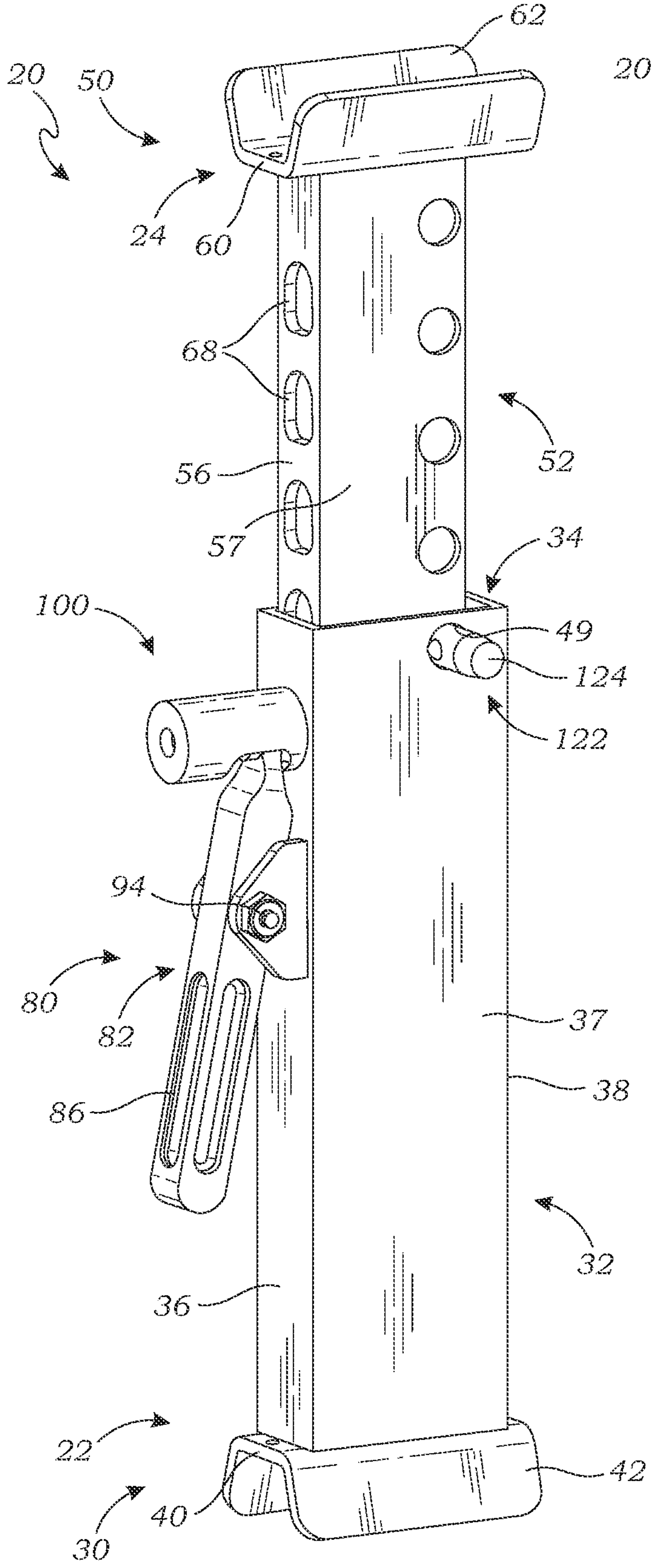
FIG. 13 is a front perspective view thereof, in accordance with at least one embodiment.

Referring next to FIGS. 12 and 13, there are shown front and back perspective views of an alternative exemplary embodiment of a jack support apparatus 20 according to aspects of the present invention. The apparatus 20 again comprises, in the exemplary embodiment, an outer tube 30, an inner tube 50 telescopically or slidably received in the outer tube 30, and a handle assembly 80 and a pin assembly 100 that cooperate to selectively adjust the overall height of the apparatus 20 in use. Once more, an outer tube jack cradle 42 at a first end 22 of the apparatus 20 and an inner tube jack cradle 62 at an opposite second end 24 of the apparatus 20 define the points of mechanical engagement with features of a hydraulic floor jack J as explained above in connection with the first exemplary embodiment as illustrated in use in FIGS. 8-11. Essentially, in the alternative exemplary embodiment of FIGS. 12 and 13, the jack support apparatus 20 is in all respects configured as in the first exemplary embodiment particularly shown in FIGS. 1 and 2, except that here a second pin or particularly a cross-pin 122 is employed as a further "fail-safe" or additional "factor of safety" for the apparatus 20 in selectively locking or fixing the positions of the outer and inner tubes 30, 50 relative to each other and thus the overall length of the apparatus 20 in then "locking" the floor jack J. In a bit more detail, and by way of illustration and not limitation, such cross-pin 122 has a cross-pin body 124 configured to pass through cross-holes 49 formed in opposite front and back walls 37, 39 of the outer tube body 32 and selectively through a pair of cross-holes 69 similarly formed in opposite front and back walls 57, 59 of the inner tube body 52 so as to again further lock the position of the outer tube 30 relative to the inner tube 50. As illustrated, such cross-pin 122 and specifically its body 124 is a basic solid annular rod that may be manually inserted or pushed through the aligned cross-holes 69 of the outer and inner tubes 30, 50 when the apparatus 20 is in a desired position. Particularly, the apparatus 20 and floor jack J would be operated as described herein, up to the point of the primary locking pin 102 seating in a hole 68 in the inner tube body 52 under the biasing effect of the pin spring 120 so as to lock the apparatus 20 and thus the jack J, whether or not involving slightly lowering the jack J to lock the apparatus 20 as by aligning the primary locking pin 102 with a hole 68 in the inner tube side wall 56, thereby effectively converting such a conventional hydraulic floor jack J into a jack stand, and thereafter the secondary cross-pin 122 would simply be inserted through the outer tube body 32 and the corresponding aligned inner tube cross-holes 69 to further lock the relative position of the outer and inner tubes 30, 50 and thus the jack support apparatus 20 as a still further "fail-safe," such that even were the primary locking pin 102 to fail, or more likely were it to have potentially failed but for the additional load bearing capacity of the cross-pin 122, the jack support apparatus 20 is further rendered safe and effective under potentially even greater loads, all of course assuming failure of the hydraulic floor jack J itself. It will be appreciated by those skilled in the art that the locations of the inner tube cross-holes 69 along the inner tube body 52 and particularly its front and back walls 57, 59 is such that for any given position of the inner tube 50 relative to the outer tube 30 as by the primary locking pin 102 engaging a side hole 68 of the inner tube 50, the inner tube cross-holes 69 are thereby similarly aligned with the cross-holes 49 formed in the outer tube 30 and thus the cross-pin 122. While as illustrated in FIGS. 12 and 13 the cross-pin 122 is inserted from the back of the apparatus 20 or starts by passing through the back walls 39, 59 of the outer and inner tube bodies 32, 52, it will be appreciated that the cross-pin 122 can just as easily be inserted from the front. By way of further illustration and not limitation, the cross-pin body 124 may be a nominally three-eighths inch (0.375 in.) diameter mild steel (e.g., 4130 steel) rod, though again, other sizes and materials of the cross-pin 122 and configurations in terms of its location on the apparatus 20 are possible according to aspects of the present invention without departing from its spirit and scope. Indeed, the location of the cross-pin 122 as shown near the top of the outer tube body 32 is to be understood as exemplary, though it will be appreciated that the cross-pin 122 being shifted to one side rather than centered on the outer tube front and back walls 37, 39 allows the cross-pin 122 to clear the central internal biasing tube spring 70 and any related outer tube sleeve 44 and inner tube rod 64.

Figure 14:
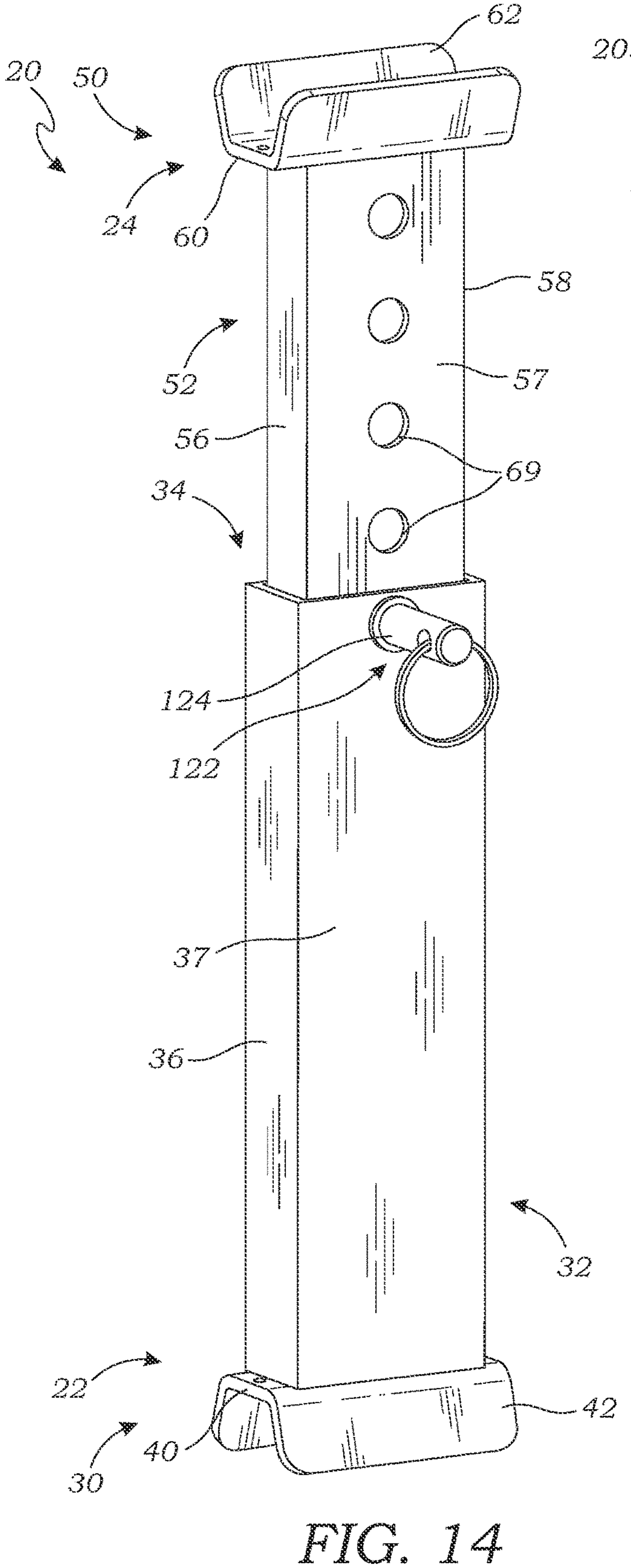
FIG. 14 is a perspective view of a further alternative exemplary jack support apparatus, in accordance with at least one embodiment.
Figure 15:
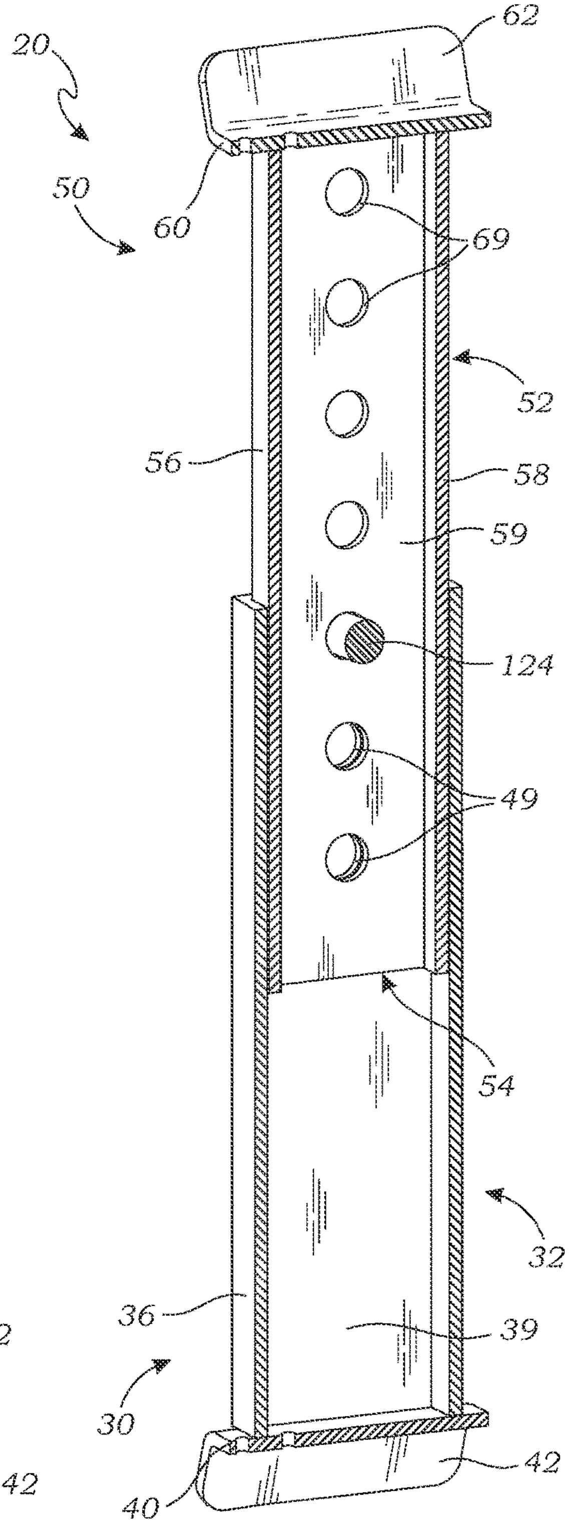
FIG. 15 is a cross-sectional perspective view thereof, in accordance with at least one embodiment.

Turning to FIGS. 14 and 15, there are shown full and cross-sectional perspective views of a further alternative exemplary embodiment of a jack support apparatus 20 according to aspects of the present invention. The apparatus 20 again comprises an outer tube 30, an inner tube 50 telescopically or slidably received in the outer tube 30, and an outer tube jack cradle 42 at a first end 22 of the apparatus 20 and an inner tube jack cradle 62 at an opposite second end 24 of the apparatus 20 that together define the points of mechanical engagement with features of a hydraulic floor jack J, though here the apparatus 20 being without any handle assembly 80 and pin assembly 100 that cooperate to selectively adjust and lock the overall height of the apparatus 20 or any internal biasing tube spring 70 that shifts the outer and inner tubes 30, 50 apart during use, instead the apparatus 20 simply having a cross-pin 122 for manually and mechanically locking the relative position of the outer and inner tubes 30, 50 and thus setting the overall length of the apparatus 20. Once more, the cross-pin 122 has a cross-pin body 124 configured to pass through cross-holes 49 formed in opposite front and back walls 37, 39 of the outer tube body 32 and selectively through a pair of cross-holes 69 similarly formed in opposite front and back walls 57, 59 of the inner tube body 52 so as to lock the position of the outer tube 30 relative to the inner tube 50. As illustrated, such cross-pin 122 and specifically its body 124 is a basic solid annular rod that may be manually inserted or pushed through the aligned cross-holes 69 of the outer and inner tubes 30, 50 when the apparatus 20 is in a desired position; here, the cross-pin 122 as shown as inserted from the front or as first passing through the outer and inner tube front walls 37, 57, though it will again be appreciated that the cross-pin 122 may be installed from either direction. It will also be appreciated that the cross-pin 122 and related cross-holes 69 along the outer and inner tube bodies 32, 52 may be positioned in a variety of locations, particularly laterally since in the alternative exemplary embodiment there are no internal components that the cross-pin 122 must clear, though being somewhat centered on the front and back walls 37, 39, 57, 59 as shown encourages even or symmetrical operation and loading. In use of the alternative exemplary jack support apparatus 20 of FIGS. 14 and 15, as illustrated in FIG. 8, the floor jack J would be operated as normally and then once at a desired height, the apparatus 20 in a collapsed or any intermediate, sufficiently short configuration as by having the cross-pin 122 initially removed can be positioned adjacent to or in engagement with the jack J such that either of the jack cradles 42, 62 is in contact with one of the jack axles A1, A2, or such that the entire apparatus 20, and particularly the opposite jack cradles 42, 62, is located between the two jack axles A1, A2. Rather than an internal spring then biasing the outer and inner tubes 30, 50 apart so as to bring the opposite jack cradles 42, 62 into contact with or adjacent to the respective jack axles A1, A2, the two tubes 30, 50 would be manually telescoped until the jack cradles 42, 62 are each as close as possible to the respective jack axles A1, A2 while aligning the inner tube cross-holes 69 with the outer tube cross-holes 49 to allow for insertion therethrough of the cross-pin 122 to thus fix the length of the apparatus 20 and provide a "fail-safe" for the jack J as herein described. The jack J and the jack support apparatus 20 may thus remain in such operable configuration, or once the cross-pin 122 has been installed as shown in FIGS. 14 and 15, to fully seat the jack axles A1, A2 in the respective opposite jack cradles 42, 62, the jack J may be lowered slightly as needed.

Figure 16:
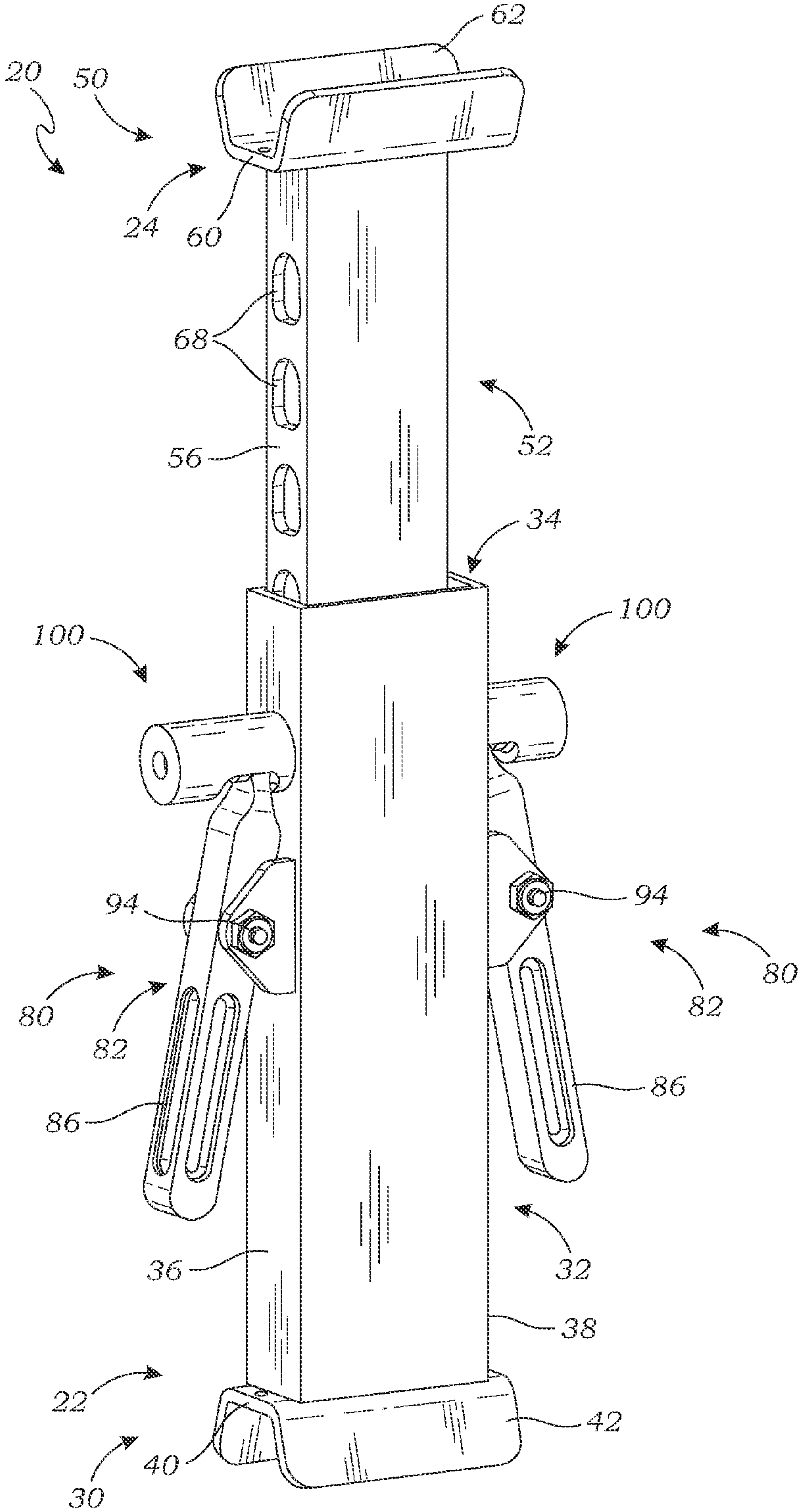
FIG. 16 is a perspective view of a still further alternative exemplary jack support apparatus, in accordance with at least one embodiment.
Figure 17:
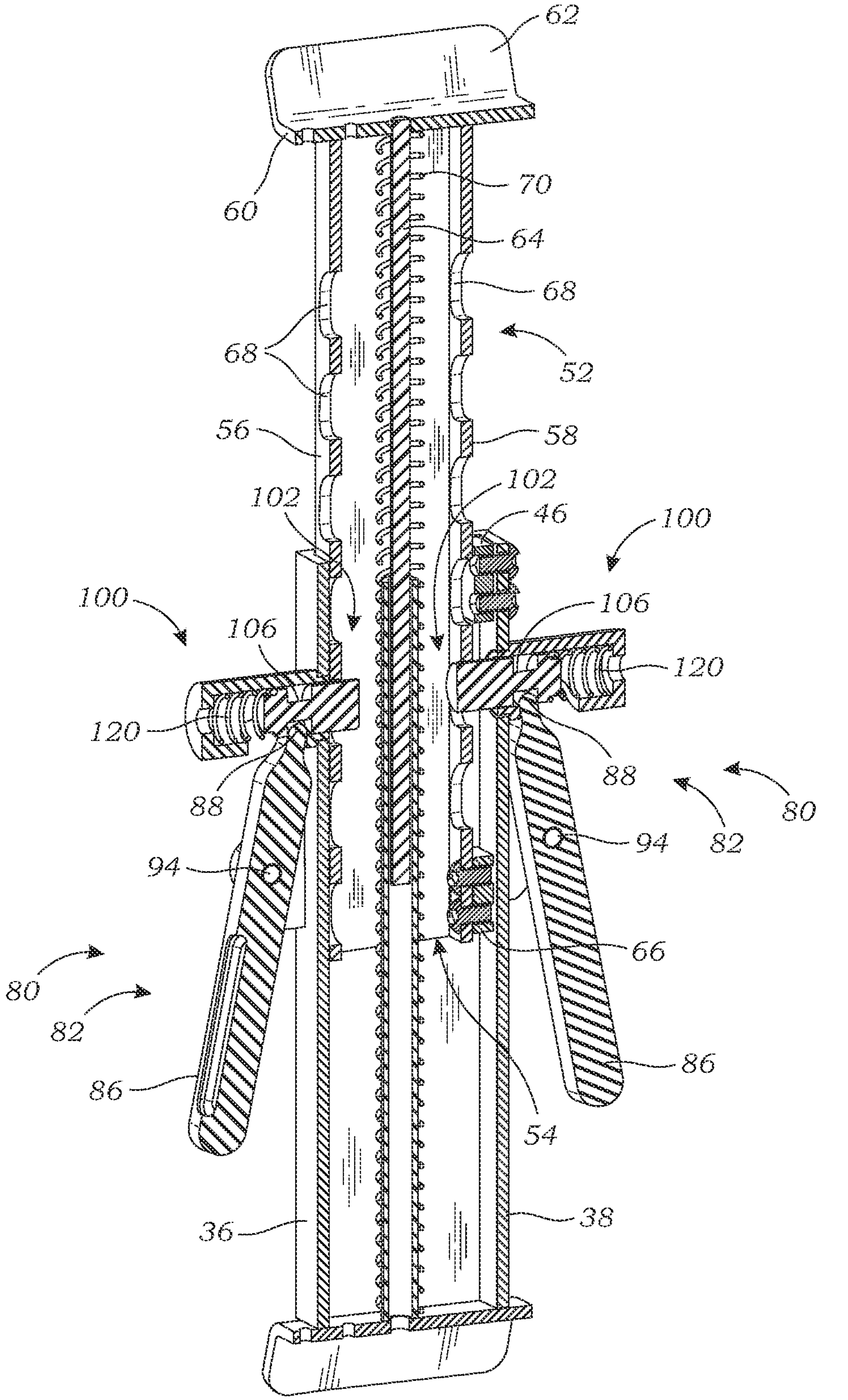
FIG. 17 is a cross-sectional perspective view thereof, in accordance with at least one embodiment.

Referring briefly to FIGS. 16 and 17, there are shown full and cross-sectional perspective views of a still further alternative exemplary embodiment of a jack support apparatus 20 according to aspects of the present invention, again comprising an outer tube 30, an inner tube 50 telescopically or slidably received in the outer tube 30, and an outer tube jack cradle 42 at a first end 22 of the apparatus 20 and an inner tube jack cradle 62 at an opposite second end 24 of the apparatus 20 that together define the points of mechanical engagement with features of a hydraulic floor jack J, here the apparatus 20 having two opposed handle assemblies 80 and pin assemblies 100 that cooperate to selectively adjust and lock the overall height of the apparatus 20, rather than one such handle assembly 80 and related pin assembly 100 as in the exemplary embodiment of FIGS. 1-11 or one such handle assembly 80 and related pin assembly 100 along with a secondary cross-pin 122 as in the alternative exemplary embodiment of FIGS. 12 and 13 or just a cross-pin 122 as in the further alternative exemplary embodiment of FIGS. 14 and 15. Accordingly, it will be appreciated that the still further alternative exemplary embodiment of FIGS. 16 and 17 is in all respects like that of FIGS. 1-11, including the internal biasing tube spring 70 that shifts the outer and inner tubes 30, 50 apart during use, here simply adding a second set of handle and pin assemblies 80, 100 to the opposite side of the apparatus 20 to effectively double the load capacity of the apparatus 20. More particularly, the two sets of handle and pin assemblies 80, 100 are operably installed on opposite outer tube side walls 36, 38 and thus the inner tube holes 68 are correspondingly formed in the respective opposite inner tube side walls 56, 58. Those skilled in the art will further appreciate that such an alternative configuration of a jack support apparatus 20 according to aspects of the present invention still has the advantages of being operated by one hand, as by squeezing opposite handles 86 with or between a user's thumb and fingers, and having both the expansion of the apparatus 20 and the engagement of the opposite pins 102 within opposite respective inner tube holes 68 being spring-assisted and thus somewhat automated, while now again effectively being doubled in its load bearing capacity, for example. It will be appreciated that a variety of other such configurations and combinations of locking pin(s) 102 and/or cross-pin(s) are possible according to aspects of the present invention without departing from its spirit and scope.

Figure 18:
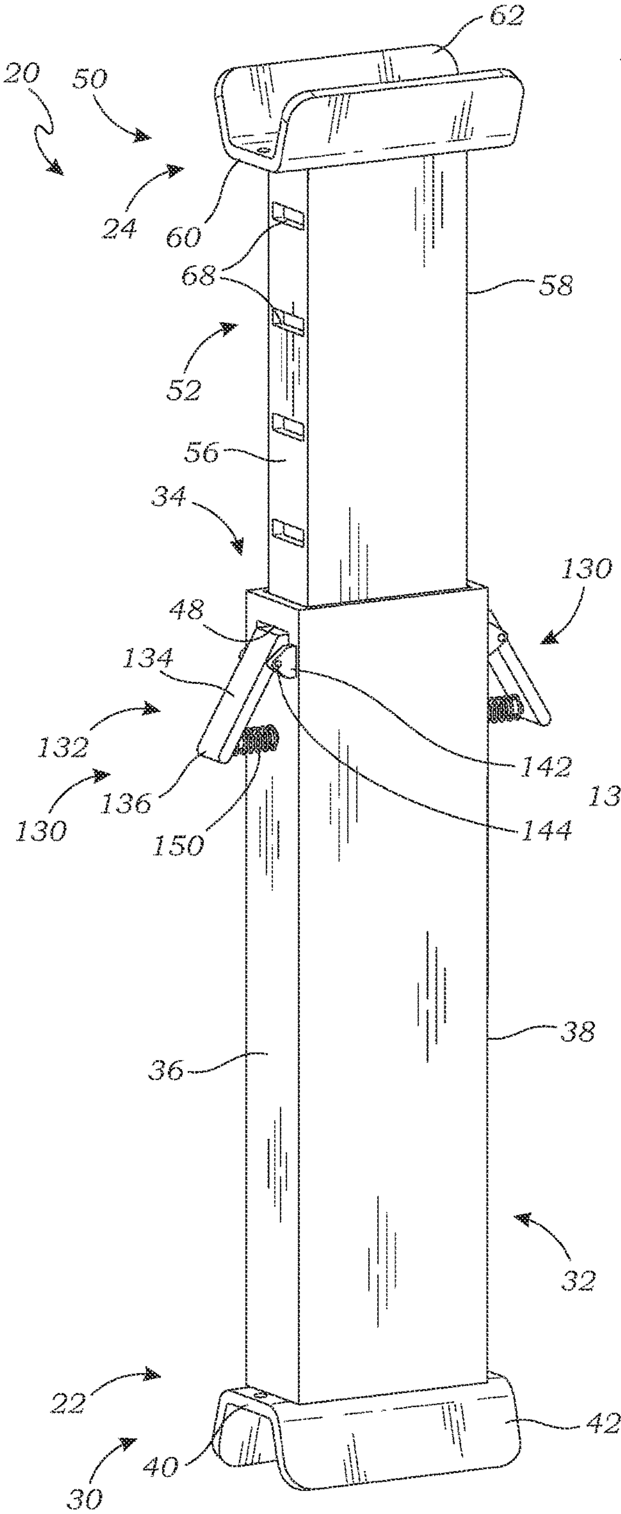
FIG. 18 is a perspective view of a still further alternative exemplary jack support apparatus, in accordance with at least one embodiment.
Figure 19:
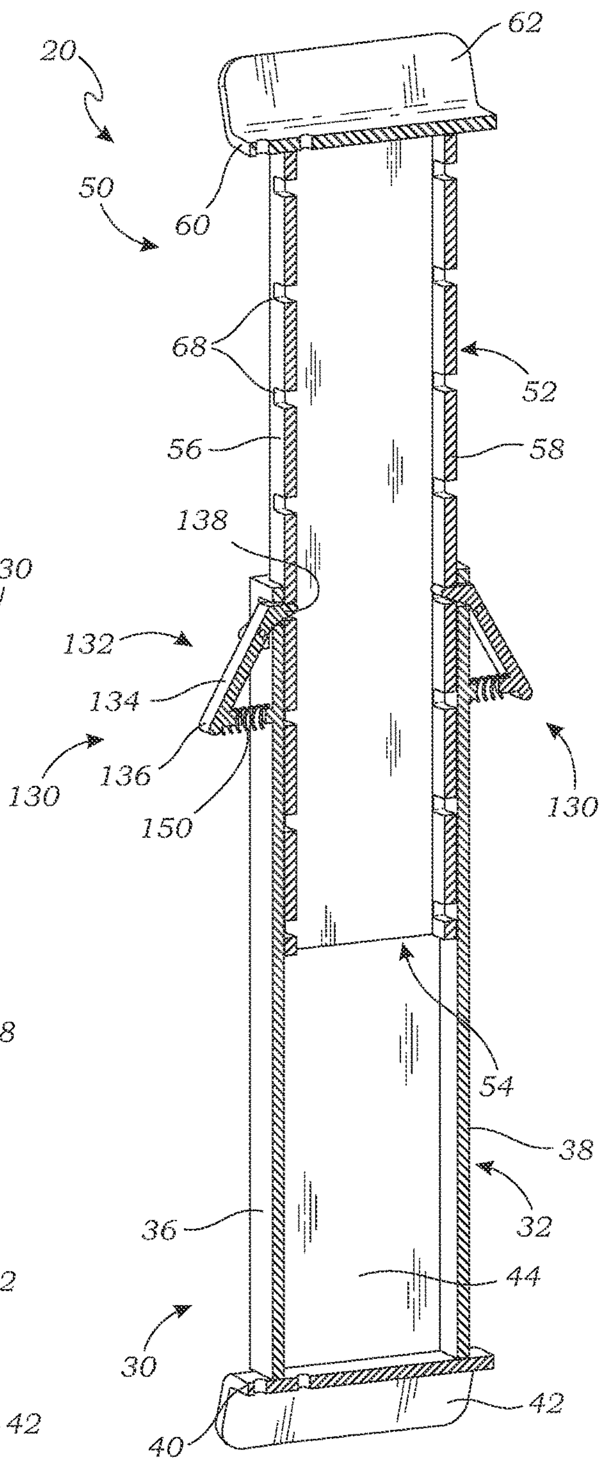
FIG. 19 is a cross-sectional perspective view thereof, in accordance with at least one embodiment.

Turning finally to FIGS. 18 and 19, there are shown full and cross-sectional perspective views of a still further alternative exemplary embodiment of a jack support apparatus 20 according to aspects of the present invention, again comprising an outer tube 30, an inner tube 50 telescopically or slidably received in the outer tube 30, and an outer tube jack cradle 42 at a first end 22 of the apparatus 20 and an inner tube jack cradle 62 at an opposite second end 24 of the apparatus 20 that together define the points of mechanical engagement with features of a hydraulic floor jack J. Here, the apparatus 20 has a pair of opposite lever assemblies 130 somewhat analogous to the handle assembly 80 and thus to the alternative exemplary embodiment of FIGS. 16 and 17 having two such opposed handle assemblies 80. Spaced-apart holes 68 are again formed along the side walls 56, 58 of the inner tube body 52, here once again on opposite short sides, each such hole 68 configured to be selectively engaged by a tip 138 of a pivoting lever 132 operably installed as part of a lever assembly 130 on the respective outer tube side walls 36, 38 in order to fix the position of the inner tube 50 relative to the outer tube 30. In more detail, each lever assembly 130 comprises a lever 132 having a lever body 134 that is pivotally installed on a lever base 142 via a lever cross-pin 144, with the lever body 134 having a proximal lever grip 136 for selectively grasping, pressing, squeezing, or otherwise operating the lever 132 of the lever assembly 130 and a distal lever tip 138 formed at angle to the lever body 134 on an end opposite of the lever grip 136 and relatively closer to the lever cross-pin 144 pivot point, with the lever tip 138 so configured as to operate somewhat laterally within a corresponding outer tube hole 48 formed in the respective outer tube side wall 36, 38, whereby squeezing or otherwise shifting the lever grip 136 inwardly or toward the respective outer tube side wall 36, 38 serves to shift the opposite distal lever tip 138 operating within the outer tube hole 48 outwardly or away from the respective outer and inner tube side walls 36, 38, 56, 58 and thus out of any engagement within a corresponding inner tube hole 68 so as to thus "unlock" the apparatus 20 and allow for relative movement between the outer and inner tubes 30, 50. Whereas releasing the lever grips 136 causes the lever grips 136 or the proximal ends of the lever bodies 134 to shift outwardly or away from the respective outer tube side wall 36, 38 under the biasing effect of the compression spring 150 operably positioned between each lever grip 136 and the respective outer tube side wall 36, 38 so as to thereby cause each distal lever tip 138 to shift inwardly or toward the respective outer and inner tube side walls 36, 38, 56, 58 and thus through the respective outer tube hole 48 and into engagement within a corresponding inner tube hole 68 so as to thus "lock" the apparatus 20, thereby setting the overall length of the apparatus 20 in use, an exemplary intermediate position between fully extended and fully retracted positions being shown. It will be appreciated that with the lever tips 138 biased inwardly so as to force the tips 138 toward the inner tube body 52 and into a corresponding hole 68 of the inner tube 50 once aligned, the default is for the apparatus 20 to lock in position as in other exemplary embodiments shown and described herein, though it will be appreciated that such is not necessarily the case. In any event, it will be further appreciated that the lever tip 138 thus functions as or defines the pin 102 as in other exemplary embodiments. Relatedly, in the alternative exemplary embodiment of FIGS. 18 and 19, there is not shown any internal biasing spring or the like to bias the outer and inner tubes 30, 50 apart, such that when the apparatus 20 is released as by squeezing or operating each lever assembly 130 this allows the inner tube 50 to manually slide or move freely relative to the outer tube 30, or specifically the inner tube body 52 relative to the outer tube body 32, though again, an internal or other biasing component or assembly may be incorporated in the apparatus 20 as well without departing from the spirit and scope of the invention. Those skilled in the art will appreciate that other such arrangements of the one or more lever assembly 130, alone or in combination with other assemblies, including but not limited to the exemplary handle and pin assemblies 80, 100, or other locking features, including but not limited to the cross-pin 122, may be employed according to aspects of the present invention. And even with the exemplary lever assembly 130, it will be appreciated that while two such opposed assemblies 130 are illustrated, one or even three or more may instead be employed. And once again, any such locking mechanisms as disclosed herein may be modified or combined in forming a jack support apparatus 20 according to aspects of the present invention without departing from its spirit and scope. By way of further illustration and not limitation, a cross-pin 122 as shown in FIGS. 12-15 may be employed in the alternative exemplary apparatus of FIGS. 18 and 19, as well as the alternative exemplary apparatus of FIGS. 16 and 17. Accordingly, all such exemplary configurations of a jack support apparatus 20 according to aspects of the present invention are to be understood as illustrative and non-limiting.

Aspects of the present specification may also be described as follows:

1. A jack support apparatus for operably engaging and selectively locking a hydraulic floor jack having a wheel axle and a cup axle, the apparatus comprising an outer tube having an outer tube body comprising at least one outer tube wall with an outer tube hole formed in the outer tube wall, an outwardly-extending outer tube jack cradle, and an outer tube opening opposite the outer tube end wall, the outer tube jack cradle configured to selectively engage one of the wheel axle and the cup axle, an inner tube having an inner tube body comprising at least one inner tube wall with a plurality of spaced-apart inner tube holes formed in the inner tube wall and an outwardly-extending inner tube jack cradle, the inner tube body slidably received within the outer tube body through the outer tube opening with the inner tube wall adjacent to the outer tube wall, the inner tube jack cradle configured to selectively engage one of the wheel axle and the cup axle, the outer tube jack cradle and the inner tube jack cradle being opposite and symmetrical, and a pin operable through the outer tube hole for selectively engaging any of the plurality of inner tube holes, wherein selective operation of the pin by shifting the pin away from the inner tube disengages the pin from any of the plurality of inner tube holes and allows the inner tube to shift relative to the outer tube as by the inner tube body sliding within the outer tube body, and further wherein selective operation of the pin by shifting the pin toward the inner tube engages the pin in one of the plurality of inner tube holes as the inner tube shifts relative to the outer tube as by the inner tube body sliding within the outer tube body to align the outer tube hole with a select one of the plurality of inner tube holes to prevent further relative movement between the outer tube and the inner tube, whereby the apparatus is configured to temporarily form a rigid linkage between the wheel and cup axles upon engagement therebetween by the outer tube and inner tube jack cradles to effectively lock the jack against further downward movement.

2. The apparatus of embodiment 1 further comprising a pin assembly having a pin housing located on the outer tube wall about the outer tube hole, the pin slidably inserted within the pin housing, the pin assembly further having a pin spring operably seated within the pin housing so as to bias the pin toward the inner tube through the outer tube wall.

3. The apparatus of embodiment 1 or embodiment 2 wherein the pin comprises a pin body having an intermediate pin undercut.

4. The apparatus of embodiment 3 wherein the pin body is annular and the pin undercut is circumferential.

5. The apparatus of any of embodiments 2-4 wherein the pin housing is formed having a pin housing side wall opening.

6. The apparatus of embodiment 5 further comprising a handle assembly having a handle pivotally mounted on a handle base located on the outer tube body, the handle having a handle body comprising a handle grip, an opposite handle tip, and an intermediate handle cross-hole for pivotally-mounting the handle on the handle base, the handle tip operably engaging the pin undercut through the pin housing side wall opening, whereby selective actuation of the handle by shifting the handle grip toward the outer tube lifts the handle tip and the pin away from the inner tube against the biasing effect of the pin spring so as to disengage the pin body from any of the plurality of inner tube holes, and further whereby selective release of the handle by releasing the handle grip allows the pin to slidably shift toward the inner tube under the biasing effect of the pin spring so as to engage the pin body in one of the plurality of inner tube holes as the inner tube is shifted relative to the outer tube as by the inner tube body sliding within the outer tube body until the pin body enters one of the plurality of inner tube holes.

7. The apparatus of embodiment 6 wherein the handle is approximately 4.25 inches long from the handle grip to the handle tip.

8. The apparatus of embodiment 6 or embodiment 7 wherein the handle cross-hole is approximately 1.25 inches from the handle tip.

9. The apparatus of any of embodiments 6-8 wherein the distance from the handle cross-hole to the handle tip is no more than 40% of the overall length of the handle from the handle grip to the handle tip.

10. The apparatus of any of embodiments 6-9 wherein a handle cross-pin is inserted through the handle cross-hole to pivotally mount the handle on the handle base.

11. The apparatus of any of embodiments 6-10 wherein the handle tip is approximately 0.2 inch thick.

12. The apparatus of any of embodiments 6-11 wherein the handle is aluminum.

13. The apparatus of any of embodiments 6-12 comprising two opposed pin assemblies and respective two opposed handle assemblies, whereby relative movement between the outer tube and the inner tube is further prevented.

14. The apparatus of any of embodiments 3-13 wherein the pin body is annular having a diameter of approximately 0.5 inch.

15. The apparatus of embodiment 14 wherein the pin body diameter is 0.48 inch.

16. The apparatus of any of embodiments 3-15 wherein the pin undercut is approximately 0.15 inch deep.

17. The apparatus of any of embodiments 3-16 wherein the pin body has a pin head proximal of the pin undercut for engagement with the pin spring.

18. The apparatus of any of embodiments 3-17 wherein the width of the pin body is no more than 85% of the length of the inner tube hole.

19. The apparatus of any of embodiments 5-18 wherein the pin housing further comprises a pin housing end wall opposite the outer tube hole, the pin spring seating between the pin and the pin housing end wall.

20. The apparatus of embodiment 19 wherein the pin housing end wall is formed with a pin housing end wall opening.

21. The apparatus of embodiment 19 or embodiment 20 wherein the pin housing end wall and the pin housing side wall are approximately 0.12 inch thick.

22. The apparatus of any of embodiments 2-21 wherein the pin housing is steel.

23. The apparatus of embodiment 22 wherein the pin housing is welded onto the outer tube side wall.

24. The apparatus of any of embodiments 2-23 wherein the pin spring has a free length of approximately 0.75 in. and an outside diameter of approximately 0.48 in. and a spring rate of approximately 19 lbs./in. at an installed height ranging from approximately 0.3 to 0.5 in.

25. The apparatus of any of embodiments 1-24 further comprising a lever assembly having a lever pivotally mounted on a lever base located on the outer tube body, the lever having a lever body comprising a lever grip, an opposite lever tip, and an intermediate lever cross-pin for pivotally-mounting the lever on the lever base, the lever tip selectively operably engaging one of the plurality of inner tube holes through the outer tube hole, the lever with lever tip thereby defining the pin, whereby selective actuation of the lever by shifting the lever grip toward the outer tube lifts the lever tip away from the inner tube against the biasing effect of a lever spring seated between the lever grip and the outer tube body so as to disengage the lever tip from any of the plurality of inner tube holes, and further whereby selective release of the lever by releasing the lever grip allows the lever tip to shift toward the inner tube under the biasing effect of the lever spring so as to engage the lever tip in one of the plurality of inner tube holes as the inner tube is shifted relative to the outer tube as by the inner tube body sliding within the outer tube body until the lever tip enters one of the plurality of inner tube holes.

26. The apparatus of embodiment 25 comprising two opposed lever assemblies, whereby relative movement between the outer tube and the inner tube is further prevented.

27. The apparatus of embodiment 25 or embodiment 26 wherein the lever is steel.

28. The apparatus of any of embodiments 1-27 further comprising a tube spring operable between the outer tube body and the inner tube body to bias the outer tube and the inner tube apart.

29. The apparatus of embodiment 28 wherein the tube spring is installed within the outer and inner tube bodies operable between an outer tube end wall formed on the outer tube opposite the outer tube opening and an inner tube end wall formed on the inner tube opposite an inner tube opening.

30. The apparatus of embodiment 29 wherein the outer tube end wall and the outer tube jack cradle are integral and the inner tube end wall and the inner tube jack cradle are integral.

31. The apparatus of embodiment 29 or embodiment 30 wherein the outer and inner tube end walls and the outer and inner tube jack cradles are welded onto the respective outer and inner tube bodies.

32. The apparatus of any of embodiments 29-31 further comprising an outer tube sleeve installed on the outer tube end wall so as to extend within the outer tube body toward the outer tube opening, an inner tube opening formed in the inner tube body opposite the inner tube end wall, and an inner tube rod installed on the inner tube end wall so as to extend within the inner tube body toward the inner tube opening, the inner tube rod slidably received within the outer tube sleeve as the inner tube body is slidably received within the outer tube body, wherein the tube spring is installed about the outer tube sleeve and the inner tube rod through the outer tube and inner tube openings, whereby the outer tube sleeve and inner tube rod provide lateral stability for the tube spring.

33. The apparatus of embodiment 32 wherein the outer tube sleeve is approximately 0.25 inch in inside diameter and the inner tube rod is approximately 0.188 inch in outside diameter.

34. The apparatus of embodiment 32 or embodiment 33 wherein the outer tube sleeve and the inner tube rod are approximately 7.5 inches long.

35. The apparatus of any of embodiments 29-34 wherein the outer and inner tube end walls are approximately 0.125 inch thick.

36. The apparatus of any of embodiments 28-35 wherein the tube spring has a free length of approximately 20 in. and an outside diameter of approximately 0.44 in. and a spring rate of approximately 7.5 lbs./in. at an installed height ranging from approximately 8 to 13 in.

37. The apparatus of any of embodiments 1-36 further comprising an outer tube stop installed on the outer tube body proximal the outer tube opening and an inner tube stop installed on the inner tube body proximal an inner tube opening formed in the inner tube body opposite the inner tube end wall, wherein the outer tube and inner tube stops cooperate to prevent the inner tube body from slidably disengaging from the outer tube body.

38. The apparatus of embodiment 37 wherein the outer tube and inner tube stops are approximately 0.25 inch thick.

39. The apparatus of any of embodiments 1-38 further comprising an outer tube cross-hole formed in the outer tube wall offset from the outer tube hole, a plurality of spaced-apart inner tube cross-holes formed in the inner tube wall offset from the plurality of inner tube holes, and a cross-pin configured to be selectively inserted through the outer tube cross-hole and an aligned one of the plurality of spaced-apart inner tube cross-holes, whereby relative movement between the outer tube and the inner tube is further prevented.

40. The apparatus of embodiment 39 wherein the cross-pin is steel.

41. The apparatus of embodiment 39 or embodiment 40 wherein the cross-pin is approximately 0.375 inch thick.

42. The apparatus of any of embodiments 1-41 wherein the outer and inner tube jack cradles are approximately 0.125 inch thick.

43. The apparatus of any of embodiments 1-42 wherein the outer and inner tube bodies have a rectangular profile, whereby the at least one outer tube wall defines opposite outer tube side walls, an outer tube front wall, and an opposite outer tube back wall and the at least one inner tube wall defines opposite inner tube side walls, an inner tube front wall, and an opposite inner tube back wall.

44. The apparatus of embodiment 43 wherein the outer tube body is approximately 1 inch by 2 inch in outer profile with a wall thickness of approximately 0.12 inch, whereby the outer tube body is approximately 0.88 inch by 1.88 inch in inner profile.

45. The apparatus of embodiment 44 wherein the inner tube body is approximately 0.75 inch by 1.5 inch in outer profile with a wall thickness of approximately 0.12 inch, resulting in a lateral clearance between the outer and inner tube bodies of approximately 0.065 inch.

46. The apparatus of any of embodiments 1-42 wherein the outer and inner tube bodies have an annular cross-section, whereby the at least one outer tube wall and the at least one inner tube wall are both annular.

47. The apparatus of any of embodiments 1-46 wherein the outer and inner tube bodies are approximately 7.5 inches long.

48. The apparatus of any of embodiments 1-47 wherein each of the plurality of inner tube holes has a width of approximately 0.5 inch and a length of approximately 0.65 inch.

49. The apparatus of any of embodiments 1-48 wherein the outer and inner tube bodies are steel.

50. A method of employing a jack support apparatus as defined in any one of embodiments 1-49, the method comprising the steps of positioning the apparatus adjacent to the jack between the wheel axle and the cup axle when the jack is in a raised position, shifting the apparatus such that the inner tube jack cradle is in contact with one of the wheel axle and the cup axle, retracting the pin so as to be disengaged from any of the plurality of inner tube holes to allow relative movement between the outer tube and the inner tube, sliding the outer tube body relative to the inner tube body so as to extend the apparatus until the outer tube jack cradle is in contact with one of the wheel axle and the cup axle, and inserting the pin so as to engage one of the plurality of inner tube holes to prevent relative movement between the outer tube and the inner tube.

51. The method of embodiment 50 comprising the further step, prior to the step of positioning the apparatus adjacent to the jack, of setting the length of the apparatus shorter than the distance between the wheel axle and the cup axle based on the raised position of the jack.

52. The method of embodiment 51 wherein the step of setting the length of the apparatus comprises retracting the pin so as to be disengaged from any of the plurality of inner tube holes, sliding the inner tube body relative to the outer tube body, and reinserting the pin into an inner tube hole to lock the apparatus at a desired length.

53. The method of any of embodiments 50-52 wherein the step of retracting the pin comprises squeezing the pivotable handle inwardly to lift the pin outwardly away from the inner tube.

54. The method of any of embodiments 50-53 comprising the further step, after the step of sliding the outer tube body relative to the inner tube body, of releasing the handle to allow the pin to shift inwardly toward the inner tube.

55. The method of embodiment 54 comprising the further step, after the step of releasing the handle, of slightly lowering the jack to cause the inner tube body to slide inwardly relative to the outer tube body until the pin is positioned adjacent to and may then enter an inner tube hole, wherein the apparatus and thereby the jack is locked.

56. The method of any of embodiments 50-55 comprising the further step, after the step of inserting the pin so as to engage one of the plurality of inner tube holes, of inserting a cross-pin through outer tube cross-holes formed in the outer tube body and aligned inner tube cross-holes of a plurality of spaced-apart inner tube cross-holes formed in the inner tube body to further prevent relative movement between the outer tube and the inner tube.

57. The method of any of embodiments 50-56 wherein the step of retracting the pin further comprises configuring the pin as a lever tip and squeezing a pivotable lever inwardly to lift the lever tip outwardly away from the inner tube.

58. A kit comprising a jack support apparatus as defined in any one of embodiments 1-49.

59. The kit of embodiment 58, further comprising instructional material.

60. The kit of embodiment 59, wherein the instructional material provides instructions on how to perform the method as defined in any one of embodiments 50-57.

61. Use of a jack support apparatus as defined in any one of embodiments 1-49 to selectively lock the jack against further downward movement.

62. The use of embodiment 61, wherein the use comprises a method as defined in any one of embodiments 50-57.

In closing, regarding the exemplary embodiments of the present invention as shown and described herein, it will be appreciated that a jack support apparatus is disclosed and configured for selectively locking a hydraulic floor jack against further downward movement. Because the principles of the invention may be practiced in a number of configurations beyond those shown and described, it is to be understood that the invention is not in any way limited by the exemplary embodiments, but may take numerous forms without departing from the spirit and scope of the invention. It will also be appreciated by those skilled in the art that the present invention is not limited to the particular geometries and materials of construction disclosed, but may instead entail other functionally comparable structures or materials, now known or later developed, without departing from the spirit and scope of the invention.

Certain embodiments of the present invention are described herein, including the best mode known to the inventor(s) for carrying out the invention. Of course, variations on these described embodiments will become apparent to those of ordinary skill in the art upon reading the foregoing description. The inventor(s) expect skilled artisans to employ such variations as appropriate, and the inventor(s) intend for the present invention to be practiced otherwise than specifically described herein. Accordingly, this invention includes all modifications and equivalents of the subject matter recited in the claims appended hereto as permitted by applicable law. Moreover, any combination of the above-described embodiments in all possible variations thereof is encompassed by the invention unless otherwise indicated herein or otherwise clearly contradicted by context.

Groupings of alternative embodiments, elements, or steps of the present invention are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

In some embodiments, the numbers expressing quantities of components or ingredients, properties such as dimensions, weight, concentration, reaction conditions, and so forth, used to describe and claim certain embodiments of the inventive subject matter are to be understood as being modified in some instances by terms such as "about," "approximately," or "roughly." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the inventive subject matter are approximations, the numerical values set forth in any specific examples are reported as precisely as practicable. The numerical values presented in some embodiments of the inventive subject matter may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. The recitation of numerical ranges of values herein is merely intended to serve as a shorthand method of referring individually to each separate value falling within the range. Unless otherwise indicated herein, each individual value of a numerical range is incorporated into the specification as if it were individually recited herein. Similarly, all lists of values should be considered as inclusive of intermediate values unless the context indicates the contrary.

Use of the terms "may" or "can" in reference to an embodiment or aspect of an embodiment also carries with it the alternative meaning of "may not" or "cannot." As such, if the present specification discloses that an embodiment or an aspect of an embodiment may be or can be included as part of the inventive subject matter, then the negative limitation or exclusionary proviso is also explicitly meant, meaning that an embodiment or an aspect of an embodiment may not be or cannot be included as part of the inventive subject matter. In a similar manner, use of the term "optionally" in reference to an embodiment or aspect of an embodiment means that such embodiment or aspect of the embodiment may be included as part of the inventive subject matter or may not be included as part of the inventive subject matter. Whether such a negative limitation or exclusionary proviso applies will be based on whether the negative limitation or exclusionary proviso is recited in the claimed subject matter.

The terms "a," "an," "the" and similar references used in the context of describing the present invention (especially in the context of the following claims) are to be construed to cover both the singular and the plural, unless otherwise indicated herein or clearly contradicted by context. Further, ordinal indicators-such as "first," "second," "third," etc.—for identified elements are used to distinguish between the elements, and do not indicate or imply a required or limited number of such elements, and do not indicate a particular position or order of such elements unless otherwise specifically stated.

All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the inventive subject matter and does not pose a limitation on the scope of the inventive subject matter otherwise claimed. No language in the application should be construed as indicating any non-claimed element essential to the practice of the invention.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

While aspects of the invention have been described with reference to at least one exemplary embodiment, it is to be clearly understood by those skilled in the art that the invention is not limited thereto. Rather, the scope of the invention is to be interpreted only in conjunction with the appended claims and it is made clear, here, that the inventor(s) believe that the claimed subject matter is the invention.

What is claimed is:

1. A jack support apparatus for operably engaging and selectively locking a hydraulic floor jack having a wheel axle and a cup axle, the apparatus comprising:

an outer tube having an outer tube body comprising at least one outer tube wall with an outer tube hole formed in the outer tube wall, an outwardly-extending outer tube jack cradle, and an outer tube opening opposite the outer tube jack cradle, the outer tube jack cradle configured to selectively engage one of the wheel axle and the cup axle;

an inner tube having an inner tube body comprising at least one inner tube wall with a plurality of spaced-apart inner tube holes formed in the inner tube wall and an outwardly-extending inner tube jack cradle, the inner tube body slidably received within the outer tube body through the outer tube opening with the inner tube wall adjacent to the outer tube wall, the inner tube jack cradle configured to selectively engage one of the wheel axle and the cup axle;

a tube spring operable between the outer tube body and the inner tube body to bias the outer tube and the inner tube apart; and a pin operable through the outer tube hole for selectively engaging any of the plurality of inner tube holes, wherein selective operation of the pin by shifting the pin away from the inner tube disengages the pin from any of the plurality of inner tube holes and allows the inner tube to shift relative to the outer tube as by the inner tube body sliding within the outer tube body under the biasing effect of the tube spring; and further wherein selective operation of the pin by shifting the pin toward the inner tube engages the pin in one of the plurality of inner tube holes as the inner tube shifts relative to the outer tube as by the inner tube body sliding within the outer tube body to align the outer tube hole with a select one of the plurality of inner tube holes to prevent further relative movement between the outer tube and the inner tube, whereby the apparatus is configured to temporarily form a rigid linkage between the wheel and cup axles upon engagement therebetween by the outer tube and inner tube jack cradles to effectively lock the jack against further downward movement.

2. The apparatus of claim 1 further comprising a pin assembly having a pin housing located on the outer tube wall about the outer tube hole, the pin slidably inserted within the pin housing, the pin assembly further having a pin spring operably seated within the pin housing so as to bias the pin toward the inner tube through the outer tube wall.

3. The apparatus of claim 2 wherein the pin comprises a pin body having an intermediate pin undercut.

4. The apparatus of claim 3 further comprising a handle assembly having a handle pivotally mounted on a handle base located on the outer tube body, the handle having a handle body comprising a handle grip, an opposite handle tip, and an intermediate handle cross-hole for pivotally-mounting the handle on the handle base, the handle tip operably engaging the pin undercut through a pin housing side wall opening formed in the pin housing, whereby selective actuation of the handle by shifting the handle grip toward the outer tube lifts the handle tip and the pin away from the inner tube against the biasing effect of the pin spring so as to disengage the pin body from any of the plurality of inner tube holes, and further whereby selective release of the handle by releasing the handle grip allows the pin to slidably shift toward the inner tube under the biasing effect of the pin spring so as to engage the pin body in one of the plurality of inner tube holes as the inner tube is shifted relative to the outer tube as by the inner tube body sliding within the outer tube body until the pin body enters one of the plurality of inner tube holes.

5. The apparatus of claim 4 further comprising:

an outer tube cross-hole formed in the outer tube wall offset from the outer tube hole;

a plurality of spaced-apart inner tube cross-holes formed in the inner tube wall offset from the plurality of inner tube holes; and a cross-pin configured to be selectively inserted through the outer tube cross-hole and an aligned one of the plurality of spaced-apart inner tube cross-holes, whereby relative movement between the outer tube and the inner tube is further prevented.

6. The apparatus of claim 4 comprising opposed two of the pin assemblies and respective opposed two of the handle assemblies, whereby relative movement between the outer tube and the inner tube is further prevented.

7. The apparatus of claim 2 wherein the pin housing comprises a pin housing side wall and a pin housing end wall opposite the outer tube hole, the pin spring seating between the pin and the pin housing end wall.

8. The apparatus of claim 1 further comprising:

an outer tube cross-hole formed in the outer tube wall;

a plurality of spaced-apart inner tube cross-holes formed in the inner tube wall; and a cross-pin configured to be selectively inserted through the outer tube cross-hole and an aligned one of the plurality of inner tube cross-holes, whereby relative movement between the outer tube and the inner tube is prevented.

9. The apparatus of claim 1 further comprising a lever assembly having a lever pivotally mounted on a lever base located on the outer tube body, the lever having a lever body comprising a lever grip, an opposite lever tip, and an intermediate lever cross-pin for pivotally-mounting the lever on the lever base, the lever tip selectively operably engaging one of the plurality of inner tube holes through the outer tube hole, the lever with the lever tip thereby defining the pin, whereby selective actuation of the lever by shifting the lever grip toward the outer tube lifts the lever tip away from the inner tube against the biasing effect of a lever spring seated between the lever grip and the outer tube body so as to disengage the lever tip from any of the plurality of inner tube holes, and further whereby selective release of the lever by releasing the lever grip allows the lever tip to shift toward the inner tube under the biasing effect of the lever spring so as to engage the lever tip in one of the plurality of inner tube holes as the inner tube is shifted relative to the outer tube as by the inner tube body sliding within the outer tube body until the lever tip enters one of the plurality of inner tube holes.

10. The apparatus of claim 9 comprising opposed two of the lever assemblies, whereby relative movement between the outer tube and the inner tube is further prevented.

11. The apparatus of claim 1 wherein the tube spring is installed within the outer and inner tube bodies operable between an outer tube end wall formed on the outer tube opposite the outer tube opening and an inner tube end wall formed on the inner tube opposite an inner tube opening.

12. The apparatus of claim 11 wherein the outer tube end wall and the outer tube jack cradle are integral and the inner tube end wall and the inner tube jack cradle are integral.

13. The apparatus of claim 11 further comprising:

an outer tube sleeve installed on the outer tube end wall so as to extend within the outer tube body toward the outer tube opening; and an inner tube rod installed on the inner tube end wall so as to extend within the inner tube body toward the inner tube opening, the inner tube rod slidably received within the outer tube sleeve as the inner tube body is slidably received within the outer tube body, wherein the tube spring is installed about the outer tube sleeve and the inner tube rod through the outer tube and inner tube openings, whereby the outer tube sleeve and inner tube rod provide lateral stability for the tube spring.

14. The apparatus of claim 1 further comprising:

an outer tube stop installed on the outer tube body proximal the outer tube opening; and an inner tube stop installed on the inner tube body proximal an inner tube opening formed in the inner tube body opposite the inner tube jack cradle, wherein the outer tube and inner tube stops cooperate to prevent the inner tube body from slidably disengaging from the outer tube body under the biasing influence of the tube spring.

15. The apparatus of claim 1 wherein the outer and inner tube bodies have a rectangular profile, whereby the at least one outer tube wall defines opposite outer tube side walls, an outer tube front wall, and an opposite outer tube back wall and the at least one inner tube wall defines opposite inner tube side walls, an inner tube front wall, and an opposite inner tube back wall.

16. A method of employing the jack support apparatus of claim 1 to selectively lock the jack, the method comprising the steps of:

positioning the apparatus adjacent to the jack between the wheel axle and the cup axle when the jack is in a raised position;

shifting the apparatus such that the inner tube jack cradle is in contact with one of the wheel axle and the cup axle;

retracting the pin so as to be disengaged from any of the plurality of inner tube holes to allow relative movement between the outer tube and the inner tube;

sliding the outer tube body relative to the inner tube body so as to extend the apparatus until the outer tube jack cradle is in contact with one of the wheel axle and the cup axle; and inserting the pin so as to engage the one of the plurality of inner tube holes to prevent relative movement between the outer tube and the inner tube.

17. The method of claim 16 comprising the further step, prior to the step of positioning the apparatus adjacent to the jack, of setting the length of the apparatus shorter than the distance between the wheel axle and the cup axle based on the raised position of the jack.

18. The method of claim 17 wherein the step of setting the length of the apparatus comprises retracting the pin so as to be disengaged from any of the plurality of inner tube holes, sliding the inner tube body relative to the outer tube body, and reinserting the pin into another one of the inner tube holes to lock the apparatus at a desired length.

19. The method of claim 18 wherein the step of retracting the pin comprises squeezing a pivotable handle inwardly to lift the pin outwardly away from the inner tube.

20. The method of claim 19 comprising the further step, after the step of sliding the outer tube body relative to the inner tube body, of releasing the handle to allow the pin to shift inwardly toward the inner tube.

21. The method of claim 20 comprising the further step, after the step of releasing the handle, of slightly lowering the jack to cause the inner tube body to slide inwardly relative to the outer tube body until the pin is positioned adjacent to and may then enter the another one of the inner tube holes, wherein the apparatus and thereby the jack is locked.

22. The method of claim 16 comprising the further step, after the step of inserting the pin so as to engage one of the plurality of inner tube holes, of inserting a cross-pin through outer tube cross-holes formed in the outer tube body and aligned inner tube cross-holes of a plurality of spaced-apart inner tube cross-holes formed in the inner tube body to further prevent relative movement between the outer tube and the inner tube.

23. The method of claim 16 wherein the step of retracting the pin further comprises configuring the pin as a lever tip and squeezing a pivotable lever inwardly to lift the lever tip outwardly away from the inner tube.

24. A jack support apparatus for operably engaging and selectively locking a hydraulic floor jack having a wheel axle and a cup axle, the apparatus comprising:

an outer tube having an outer tube body comprising at least one outer tube wall with an outer tube hole formed in the outer tube wall, an outwardly-extending outer tube jack cradle, and an outer tube opening opposite the outer tube jack cradle, the outer tube jack cradle configured to selectively engage one of the wheel axle and the cup axle;

an inner tube having an inner tube body comprising at least one inner tube wall with a plurality of spaced-apart inner tube holes formed in the inner tube wall and an outwardly-extending inner tube jack cradle, the inner tube body slidably received within the outer tube body through the outer tube opening with the inner tube wall adjacent to the outer tube wall, the inner tube jack cradle configured to selectively engage one of the wheel axle and the cup axle;

a pin assembly having a pin housing located on the outer tube wall about the outer tube hole and a pin slidably inserted within the pin housing and operable through the outer tube hole for selectively engaging any of the plurality of inner tube holes, the pin assembly further having a pin spring operably seated within the pin housing so as to bias the pin toward the inner tube through the outer tube wall; and a handle assembly having a handle pivotally mounted on a handle base located on the outer tube body, the handle having a handle body comprising a handle grip, an opposite handle tip, and an intermediate handle cross-hole for pivotally-mounting the handle on the handle base, the handle tip operably engaging the pin through a pin housing side wall opening formed in the pin housing, whereby selective actuation of the handle by shifting the handle grip toward the outer tube lifts the handle tip and the pin away from the inner tube against the biasing effect of the pin spring so as to disengage the pin from any of the plurality of inner tube holes, and further whereby selective release of the handle by releasing the handle grip allows the pin to slidably shift toward the inner tube under the biasing effect of the pin spring so as to engage the pin in one of the plurality of inner tube holes as the inner tube is shifted relative to the outer tube as by the inner tube body sliding within the outer tube body until the pin enters one of the plurality of inner tube holes, wherein selective operation of the pin by shifting the pin away from the inner tube disengages the pin from any of the plurality of inner tube holes and allows the inner tube to shift relative to the outer tube as by the inner tube body sliding within the outer tube body; and further wherein selective operation of the pin by shifting the pin toward the inner tube engages the pin in one of the plurality of inner tube holes as the inner tube shifts relative to the outer tube as by the inner tube body sliding within the outer tube body to align the outer tube hole with a select one of the plurality of inner tube holes to prevent further relative movement between the outer tube and the inner tube, whereby the apparatus is configured to temporarily form a rigid linkage between the wheel and cup axles upon engagement therebetween by the outer tube and inner tube jack cradles to effectively lock the jack against further downward movement.

25. A jack support apparatus for operably engaging and selectively locking a hydraulic floor jack having a wheel axle and a cup axle, the apparatus comprising:

an outer tube having an outer tube body comprising at least one outer tube wall with an outer tube hole formed in the outer tube wall, an outwardly-extending outer tube jack cradle, and an outer tube opening opposite the outer tube jack cradle, the outer tube jack cradle configured to selectively engage one of the wheel axle and the cup axle;

an inner tube having an inner tube body comprising at least one inner tube wall with a plurality of spaced-apart inner tube holes formed in the inner tube wall and an outwardly-extending inner tube jack cradle, the inner tube body slidably received within the outer tube body through the outer tube opening with the inner tube wall adjacent to the outer tube wall, the inner tube jack cradle configured to selectively engage one of the wheel axle and the cup axle;

a pin operable through the outer tube hole for selectively engaging any of the plurality of inner tube holes; and a handle assembly having a handle pivotally mounted on the outer tube body, the handle having a handle body comprising a handle grip and an opposite handle tip operably engaging the pin, whereby selective actuation of the handle by shifting the handle grip toward the outer tube lifts the handle tip and the pin away from the inner tube so as to disengage the pin from any of the plurality of inner tube holes, and further whereby selective release of the handle by releasing the handle grip allows the pin to slidably shift toward the inner tube so as to engage the pin in one of the plurality of inner tube holes as the inner tube is shifted relative to the outer tube as by the inner tube body sliding within the outer tube body until the pin enters one of the plurality of inner tube holes, wherein selective operation of the pin by shifting the pin away from the inner tube disengages the pin from any of the plurality of inner tube holes and allows the inner tube to shift relative to the outer tube as by the inner tube body sliding within the outer tube body; and further wherein selective operation of the pin by shifting the pin toward the inner tube engages the pin in one of the plurality of inner tube holes as the inner tube shifts relative to the outer tube as by the inner tube body sliding within the outer tube body to align the outer tube hole with a select one of the plurality of inner tube holes to prevent further relative movement between the outer tube and the inner tube, whereby the apparatus is configured to temporarily form a rigid linkage between the wheel and cup axles upon engagement therebetween by the outer tube and inner tube jack cradles to effectively lock the jack against further downward movement;

the apparatus further comprising an outer tube cross-hole formed in the outer tube wall offset from the outer tube hole;

a plurality of spaced-apart inner tube cross-holes formed in the inner tube wall offset from the plurality of inner tube holes; and a cross-pin configured to be selectively inserted through the outer tube cross-hole and an aligned one of the plurality of spaced-apart inner tube cross-holes, whereby relative movement between the outer tube and the inner tube is further prevented.

26. A jack support apparatus for operably engaging and selectively locking a hydraulic floor jack having a wheel axle and a cup axle, the apparatus comprising:

an outer tube having an outer tube body comprising at least one outer tube wall with opposite outer tube holes formed in the outer tube wall, an outwardly-extending outer tube jack cradle, and an outer tube opening opposite the outer tube jack cradle, the outer tube jack cradle configured to selectively engage one of the wheel axle and the cup axle;

an inner tube having an inner tube body comprising at least one inner tube wall with a plurality of opposite spaced-apart inner tube holes formed in the inner tube wall and an outwardly-extending inner tube jack cradle, the inner tube body slidably received within the outer tube body through the outer tube opening with the inner tube wall adjacent to the outer tube wall, the inner tube jack cradle configured to selectively engage one of the wheel axle and the cup axle;

opposed two pin assemblies each having a pin housing located on the outer tube wall about the respective opposite outer tube holes and a pin slidably inserted within the pin housing and operable through the respective outer tube hole for selectively engaging any of the plurality of respective inner tube holes, each pin assembly further having a pin spring operably seated within the pin housing so as to bias the pin toward the inner tube through the outer tube wall; and opposed two handle assemblies each having a handle pivotally mounted on the outer tube body, the handle having a handle body comprising a handle grip and an opposite handle tip operably engaging the respective pin, whereby selective actuation of the handles by shifting the handle grips toward the outer tube lifts the handle tips and the respective pins away from the inner tube so as to disengage the pins from any of the plurality of respective inner tube holes, and further whereby selective release of the handles by releasing the handle grips allows the pins to slidably shift toward the inner tube so as to engage the pins in one of the plurality of respective inner tube holes as the inner tube is shifted relative to the outer tube as by the inner tube body sliding within the outer tube body until the pins enter one of the plurality of respective inner tube holes, wherein selective operation of the pins by shifting the pins away from the inner tube disengages the pins from any of the plurality of respective inner tube holes and allows the inner tube to shift relative to the outer tube as by the inner tube body sliding within the outer tube body; and further wherein selective operation of the pins by shifting the pins toward the inner tube engages the pins in one of the plurality of respective inner tube holes as the inner tube shifts relative to the outer tube as by the inner tube body sliding within the outer tube body to align the outer tube hole with a select one of the plurality of inner tube holes to prevent further relative movement between the outer tube and the inner tube, whereby the apparatus is configured to temporarily form a rigid linkage between the wheel and cup axles upon engagement therebetween by the outer tube and inner tube jack cradles to effectively lock the jack against further downward movement.

27. A jack support apparatus for operably engaging and selectively locking a hydraulic floor jack having a wheel axle and a cup axle, the apparatus comprising:

an outer tube having an outer tube body comprising at least one outer tube wall with an outer tube hole formed in the outer tube wall, an outwardly-extending outer tube jack cradle, and an outer tube opening opposite the outer tube jack cradle, the outer tube jack cradle configured to selectively engage one of the wheel axle and the cup axle;

an inner tube having an inner tube body comprising at least one inner tube wall with a plurality of spaced-apart inner tube holes formed in the inner tube wall and an outwardly-extending inner tube jack cradle, the inner tube body slidably received within the outer tube body through the outer tube opening with the inner tube wall adjacent to the outer tube wall, the inner tube jack cradle configured to selectively engage one of the wheel axle and the cup axle; and a lever assembly having a lever pivotally mounted on a lever base located on the outer tube body, the lever having a lever body comprising a lever grip, an opposite lever tip, and an intermediate lever cross-pin for pivotally-mounting the lever on the lever base, the lever tip selectively operably engaging one of the plurality of inner tube holes through the outer tube hole, whereby selective actuation of the lever by shifting the lever grip toward the outer tube lifts the lever tip away from the inner tube against the biasing effect of a lever spring seated between the lever grip and the outer tube body so as to disengage the lever tip from any of the plurality of inner tube holes, and further whereby selective release of the lever by releasing the lever grip allows the lever tip to shift toward the inner tube under the biasing effect of the lever spring so as to engage the lever tip in one of the plurality of inner tube holes as the inner tube is shifted relative to the outer tube as by the inner tube body sliding within the outer tube body until the lever tip enters one of the plurality of inner tube holes, wherein selective operation of the lever assembly by squeezing the lever disengages the lever tip from any of the plurality of inner tube holes and allows the inner tube to shift relative to the outer tube as by the inner tube body sliding within the outer tube body; and further wherein selective operation of the lever assembly by releasing the lever engages the lever tip in one of the plurality of inner tube holes as the inner tube shifts relative to the outer tube as by the inner tube body sliding within the outer tube body to align the outer tube hole with a select one of the plurality of inner tube holes to prevent further relative movement between the outer tube and the inner tube, whereby the apparatus is configured to temporarily form a rigid linkage between the wheel and cup axles upon engagement therebetween by the outer tube and inner tube jack cradles to effectively lock the jack against further downward movement.

28. A jack support apparatus for operably engaging and selectively locking a hydraulic floor jack having a wheel axle and a cup axle, the apparatus comprising:

an outer tube having an outer tube body comprising at least one outer tube wall with an outer tube hole formed in the outer tube wall, an outer tube end wall, an outwardly-extending outer tube jack cradle integral with the outer tube end wall, and an outer tube opening opposite the outer tube jack cradle, the outer tube jack cradle configured to selectively engage one of the wheel axle and the cup axle;

an inner tube having an inner tube body comprising at least one inner tube wall with a plurality of spaced-apart inner tube holes formed in the inner tube wall, an inner tube end wall, and an outwardly-extending inner tube jack cradle integral with the inner tube end wall, the inner tube body slidably received within the outer tube body through the outer tube opening with the inner tube wall adjacent to the outer tube wall, the inner tube jack cradle configured to selectively engage one of the wheel axle and the cup axle;

a tube spring operable between the outer tube body and the inner tube body to bias the outer tube and the inner tube apart; and a pin operable through the outer tube hole for selectively engaging any of the plurality of inner tube holes, wherein selective operation of the pin by shifting the pin away from the inner tube disengages the pin from any of the plurality of inner tube holes and allows the inner tube to shift relative to the outer tube as by the inner tube body sliding within the outer tube body under the biasing effect of the tube spring; and further wherein selective operation of the pin by shifting the pin toward the inner tube engages the pin in one of the plurality of inner tube holes as the inner tube shifts relative to the outer tube as by the inner tube body sliding within the outer tube body to align the outer tube hole with a select one of the plurality of inner tube holes to prevent further relative movement between the outer tube and the inner tube, whereby the apparatus is configured to temporarily form a rigid linkage between the wheel and cup axles upon engagement therebetween by the outer tube and inner tube jack cradles to effectively lock the jack against further downward movement.

* * * * *